US012713371B2

(12) United States Patent
Rodriguez Fernandez et al.

(10) Patent No.: US 12,713,371 B2
(45) Date of Patent: Aug. 18, 2026

(54) SYNCHRONIZATION SIGNAL BLOCK DESIGN FOR NARROWBAND OPERATION

(71) Applicant: QUALCOMM Incorporated, San Diego, CA (US)

(72) Inventors: Javier Rodriguez Fernandez, San Diego, CA (US); Le Liu, San Jose, CA (US); Toni Harri Henrikki Laehteensuo, Helsinki (FI); Jae Ho Ryu, San Diego, CA (US); Alberto Rico Alvarino, San Diego, CA (US); James Beckman, La Jolla, CA (US); Prashant Sharma, San Marcos, CA (US); Peter Gaal, San Diego, CA (US); Juan Montojo, San Diego, CA (US)

(73) Assignee: QUALCOMM Incorportated, San Diego, CA (US)

( * ) Notice: Subject to any disclaimer, the term of this patent is extended or adjusted under 35 U.S.C. 154(b) by 330 days.

(21) Appl. No.: 18/494,451

(22) Filed: Oct. 25, 2023

(65) Prior Publication Data

US 2024/0340821 A1 Oct. 10, 2024

Related U.S. Application Data

(60) Provisional application No. 63/494,668, filed on Apr. 6, 2023.

(51) Int. Cl.
*H04W 56/00* (2009.01)
*H04L 1/00* (2006.01)

(52) U.S. Cl.
CPC ....... *H04W 56/0015* (2013.01); *H04L 1/0068* (2013.01)

(58) Field of Classification Search
CPC ........... H04W 56/0015; H04W 56/001; H04W 56/0025; H04L 1/0068
See application file for complete search history.

(56) References Cited

U.S. PATENT DOCUMENTS

2015/0358975 A1 12/2015 Yang et al.
2019/0394747 A1* 12/2019 Akkarakaran ........ H04L 5/0007
(Continued)

FOREIGN PATENT DOCUMENTS

EP 4037237 8/2022
EP 4037237 A1 * 8/2022 ............. H04L 5/005
(Continued)

OTHER PUBLICATIONS

Futurewei: "Discussion on Enhancements for less than 5 MHz Dedicated Spectrum", 3GPP TSG RAN WG1 Meeting #112, R1-2300059, 3rd Generation Partnership Project, Mobile Competence Centre, 650, Route Des Lucioles, F-06921, Sophia-Antipolis Cedex, France, vol. 3GPP RAN 1, No. Athens, GR, Feb. 27, 2023-Mar. 3, 2023, Feb. 17, 2023, 20 Pages, XP052247212.
(Continued)

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, a synchronization signal block (SSB) associated with an SSB configuration for an operating band having a transmission bandwidth that is narrower than a channel bandwidth. The UE may decode the SSB based at least in part on the SSB configuration. Numerous other aspects are described.

25 Claims, 14 Drawing Sheets

(56) References Cited

U.S. PATENT DOCUMENTS

| | | | | |
|---|---|---|---|---|
| 2021/0243703 | A1* | 8/2021 | Wolf | H04L 5/0094 |
| 2021/0329579 | A1* | 10/2021 | Sakhnini | H04W 56/0015 |
| 2021/0337489 | A1* | 10/2021 | Abotabl | H04W 72/0453 |
| 2022/0141881 | A1* | 5/2022 | Bai | H04W 74/0833 370/329 |
| 2022/0240253 | A1* | 7/2022 | Sakhnini | H04L 5/0048 |
| 2024/0015678 | A1 | 1/2024 | Liu et al. | |
| 2024/0340821 | A1* | 10/2024 | Rodriguez Fernandez | H04W 56/0015 |
| 2025/0266954 | A1* | 8/2025 | Liu | H04L 1/0013 |

FOREIGN PATENT DOCUMENTS

| | | | | |
|---|---|---|---|---|
| TW | 202135552 A | * | 9/2021 | H04W 72/0453 |
| WO | 2022165468 | | 8/2022 | |

OTHER PUBLICATIONS

International Search Report and Written Opinion—PCT/US2024/019524—ISA/EPO—Jul. 11, 2024.

Moderator (Lenovo): "Summary#2 of Discussion on Enhancements to Operate NR on Dedicated Spectrum less than 5MHZH", 3GPP TSG RAN WG1 #115, R1-2312398, 3rd Generation Partnership Project, Mobile Competence Centre, 650, Route Des Lucioles, F-06921, Sophia-Antipolis Cedex, France, vol. 3GPP RAN 1, No. Chicago, US, Nov. 13, 2023-Nov. 17, 2023, Nov. 17, 2023, 38 Pages, XP052548282.

Nokia, et al., "NR Support for Below 5 MHz BW", 3GPP TSG RAN WG1 #112, R1-2301096, 3rd Generation Partnership Project, Mobile Competence Centre, 650, Route Des Lucioles, F-06921, Sophia-Antipolis Cedex, France, vol. 3GPP RAN 1, No. Athens, GR, Feb. 27, 2023-Mar. 3, 2023, Feb. 17, 2023, 24 Pages, XP052248235.

* cited by examiner

Figure 7C:
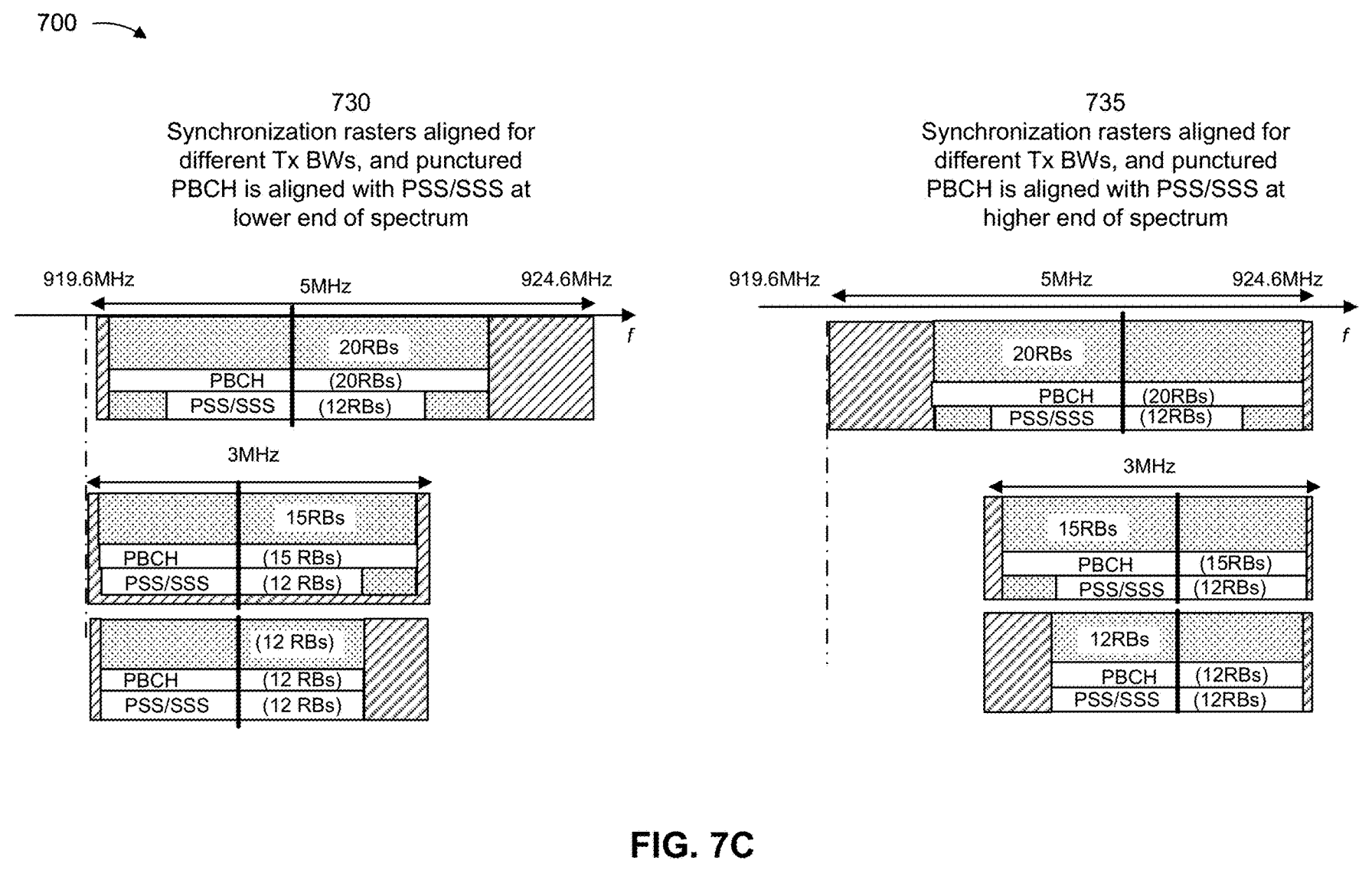

700

730
Synchronization rasters aligned for different Tx BWs, and punctured PBCH is aligned with PSS/SSS at lower end of spectrum 919.6MHz
5MHz
924.6MHz
f
20RBs
PBCH (20RBs)
PSS/SSS (12RBs)
3MHz
15RBs
PBCH (15 RBs)
PSS/SSS (12 RBs)
(12 RBs)
PBCH (12 RBs)
PSS/SSS (12 RBs)

735
Synchronization rasters aligned for different Tx BWs, and punctured PBCH is aligned with PSS/SSS at higher end of spectrum 919.6MHz
5MHz
924.6MHz
f
20RBs
PBCH (20RBs)
PSS/SSS (12RBs)
3MHz
15RBs
PBCH (15RBs)
PSS/SSS (12RBs)
12RBs
PBCH (12RBs)
PSS/SSS (12RBs)

SYNCHRONIZATION SIGNAL BLOCK DESIGN FOR NARROWBAND OPERATION

CROSS-REFERENCE TO RELATED APPLICATION

This Patent Application claims priority to U.S. Provisional Patent Application No. 63/494,668, filed on Apr. 6, 2023, entitled "SYNCHRONIZATION SIGNAL BLOCK DESIGN FOR NARROWBAND OPERATION," and assigned to the assignee hereof. The disclosure of the prior application is considered part of and is incorporated by reference into this Patent Application.

FIELD OF THE DISCLOSURE

Aspects of the present disclosure generally relate to wireless communication and to techniques and apparatuses associated with a synchronization signal block (SSB) design for narrowband operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, a synchronization signal block (SSB) associated with an SSB configuration for an operating band having a transmission bandwidth that is narrower than a channel bandwidth. The method may include decoding the SSB based at least in part on the SSB configuration.

Some aspects described herein relate to a method of wireless communication performed by a network node. The method may include generating an SSB associated with an SSB configuration for an operating band having a transmission bandwidth that is narrower than a channel bandwidth. The method may include transmitting the SSB associated with the SSB configuration.

Some aspects described herein relate to a UE for wireless communication. The UE may include a memory and one or more processors coupled to the memory. The one or more processors may be configured to receive, from a network node, an SSB associated with an SSB configuration for an operating band having a transmission bandwidth that is narrower than a channel bandwidth. The one or more processors may be configured to decode the SSB based at least in part on the SSB configuration.

Some aspects described herein relate to a network node for wireless communication. The network node may include a memory and one or more processors coupled to the memory. The one or more processors may be configured to generate an SSB associated with an SSB configuration for an operating band having a transmission bandwidth that is narrower than a channel bandwidth. The one or more processors may be configured to transmit the SSB associated with the SSB configuration.

Some aspects described herein relate to a non-transitory computer-readable medium that stores a set of instructions for wireless communication by a UE. The set of instructions, when executed by one or more processors of the UE, may cause the UE to receive, from a network node, an SSB associated with an SSB configuration for an operating band having a transmission bandwidth that is narrower than a channel bandwidth. The set of instructions, when executed by one or more processors of the UE, may cause the UE to decode the SSB based at least in part on the SSB configuration.

Some aspects described herein relate to a non-transitory computer-readable medium that stores a set of instructions for wireless communication by a network node. The set of instructions, when executed by one or more processors of the network node, may cause the network node to generate an SSB associated with an SSB configuration for an operating band having a transmission bandwidth that is narrower than a channel bandwidth. The set of instructions, when executed by one or more processors of the network node, may cause the network node to transmit the SSB associated with the SSB configuration.

Some aspects described herein relate to an apparatus for wireless communication. The apparatus may include means for receiving, from a network node, an SSB associated with an SSB configuration for an operating band having a transmission bandwidth that is narrower than a channel bandwidth. The apparatus may include means for decoding the SSB based at least in part on the SSB configuration.

Some aspects described herein relate to an apparatus for wireless communication. The apparatus may include means for generating an SSB associated with an SSB configuration for an operating band having a transmission bandwidth that is narrower than a channel bandwidth. The apparatus may include means for transmitting the SSB associated with the SSB configuration.

Aspects generally include a method, apparatus, system, computer program product, non-transitory computer-readable medium, UE, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals May include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7D are diagrams illustrating examples associated with an SSB design for narrowband operation, in accordance with the present disclosure.

DETAILED DESCRIPTION

Figure 1:
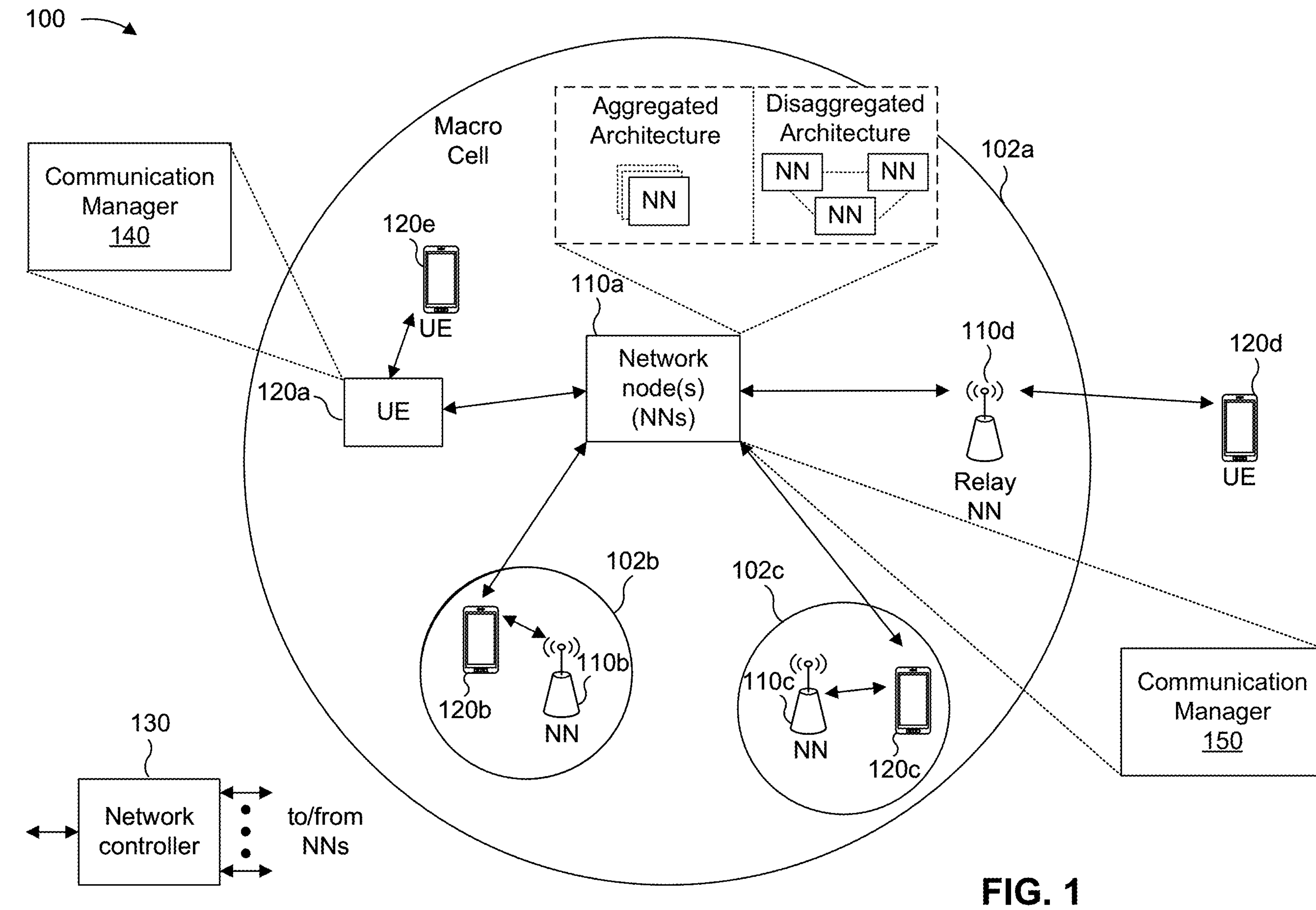
FIG. 1 is a diagram illustrating an example of a wireless network, in accordance with the present disclosure.

In a wireless network, such as a New Radio (NR) network, a network node periodically broadcasts or otherwise transmits a synchronization signal block (SSB) over an access link (e.g., a Uu interface) to enable initial network acquisition and synchronization for a user equipment (UE). Additionally, or alternatively, the SSB may be used for cell search on an access link, beam management on an access link, and/or beam selection on an access link, among other examples. For example, an SSB typically includes a primary synchronization signal (PSS), a secondary synchronization signal (SSS), and a physical broadcast channel (PBCH) carrying information that a UE may use to derive, decode, or otherwise obtain necessary information to access a cell provided by the network node (e.g., a radio frame boundary, a physical cell identity, and/or a master information block (MIB) that provides parameters to acquire system information block Type 1 (SIB1), among other examples). Furthermore, in some aspects, the PBCH often includes a demodulation reference signal (DMRS) that carries a pseudo-noise (PN) sequence or other suitable information to enable a UE to perform channel estimation to demodulate or decode the PBCH.

In general, as described herein, an SSB transmitted on an access link (e.g., a legacy SSB) typically occupies four (4) consecutive symbols in a time domain and includes a PSS, an SSS, and a PBCH spread over 240 subcarriers in a frequency domain (e.g., 20 resource blocks (RBs) that each include 12 subcarriers). The PSS typically occupies a first symbol ($s_0$) and spans 127 subcarriers, and the SSS is located in the third symbol ($s_2$) and spans 127 subcarriers, with 8 unused subcarriers above the SSS and 9 unused subcarriers below the SSS. Furthermore, the PBCH typically occupies two full symbols, spanning 240 subcarriers (or 20 RBs) in the second symbol ($s_1$) and the fourth symbol ($s_3$), and the PBCH partially occupies the third symbol ($s_2$), spanning 48 subcarriers (or 4 RBs) above the SSS and 48 subcarriers (or 4 RBs) below the SSS, whereby the PBCH occupies 576 subcarriers across three symbols. Furthermore, the PBCH DMRS occupies three (3) REs in each RB allocated to the PBCH, whereby the PBCH DMRS occupies 144 REs across three symbols (e.g., 3 REs in each of 48 RBs allocated to the PBCH) and the remaining 432 REs in the 48 RBs allocated to the PBCH carry the PBCH payload.

Accordingly, in a typical (e.g., legacy) SSB configuration, an SSB generally has a minimum bandwidth that is based at least in part on a subcarrier spacing. For example, in an NR network, a subcarrier spacing can be 15 kilohertz (kHz), 30 kHz, 60 kHz, or 120 kHz. In cases where a network node communicates in an operating band that uses the lowest possible subcarrier spacing of 15 kHz, each RB may require a bandwidth of 0.18 MHz (e.g., based on each RB including 12 subcarriers). Accordingly, because the SSB spans 240 subcarriers across 20 RBs and the smallest subcarrier spacing supported in an NR network is 15 kHz, the minimum bandwidth for an SSB in an NR network is 3.6 MHz. However, in some cases, a network node may communicate in an operating band having a maximum transmission bandwidth that is narrower than the minimum SSB bandwidth of 3.6 MHz. For example, in some cases, a base station may communicate using frequency division duplexing (FDD) in the 900 MHz band (sometimes referred to as the 33-centimeter band), which includes 5 MHz of spectrum in a range from 896-901 MHz and another 5 MHz of spectrum in a range from 935-940 MHz. For example, the network node may be allocated 3 MHz of spectrum to use for uplink communication and 3 MHz of spectrum to use for downlink communication, which is below the minimum SSB bandwidth of 3.6 MHz. In another example, NR Railway (NR-R) may be deployed in a future railway mobile communication system (FRMCS) band (e.g., the n100 band), which includes 5.6 MHz of spectrum allocated to uplink communication and 5.6 MHz of spectrum allocated to downlink communication. However, the NR-R operation needs to coexist with global system for mobile communications-railway (GSM-R) operation in the FRMCS band, which may occupy 1.8 MHz or 2.4 MHz, effectively limiting the 5.6 MHz channel bandwidth to a 3.6 MHz or 3 MHz transmission bandwidth for the NR-R operation.

Some aspects described herein relate to techniques and apparatuses to enable an SSB configuration for narrowband operation. For example, some aspects described herein relate to SSB configurations that may be used in cases where an available transmission bandwidth for an SSB is 2.16 MHz (or 12 RBs) or 2.7 MHz (or 15 RBs) within a 3 MHz channel bandwidth and/or in cases where an available transmission bandwidth for an SSB is 3.6 MHz (or 20 RBs) within a 5 MHz channel bandwidth. In other words, the SSB configurations described herein may be suitable in cases where a transmission bandwidth is less than 5 MHz. For example, as described herein, some aspects may provide SSB configurations that occupy a bandwidth within the maximum bandwidth of the operating band in cases where the maximum bandwidth of the operating band is narrower than the minimum SSB bandwidth. In this way, a network node may configure and transmit an SSB that carries the minimum necessary signals to enable access to an NR network (e.g., a PSS, SSS, and PBCH), which may significantly expand the spectrum in which NR can be deployed. For example, by enabling a network node to configure and transmit an SSB that occupies less than the minimum SSB bandwidth, NR can be deployed in low bandwidth spectrum that may be well-suited to cover large areas and/or other limited spectrum (e.g., to enable broadband services in a utility grid private network, a railway system, or other suitable industries).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, an SSB associated with an SSB configuration for an operating band having a transmission bandwidth that is narrower than a channel bandwidth; and decode the SSB based at least in part on the SSB configuration. Additionally, or alternatively, the communication manager 140 may perform one or more other operations described herein.

In some aspects, the network node 110 may include a communication manager 150. As described in more detail elsewhere herein, the communication manager 150 may generate an SSB associated with an SSB configuration for an operating band having a transmission bandwidth that is narrower than a channel bandwidth; and transmit the SSB associated with the SSB configuration. Additionally, or alternatively, the communication manager 150 may perform one or more other operations described herein.

As indicated above, FIG. 1 is provided as an example. Other examples may differ from what is described with regard to FIG. 1.

Figure 2:
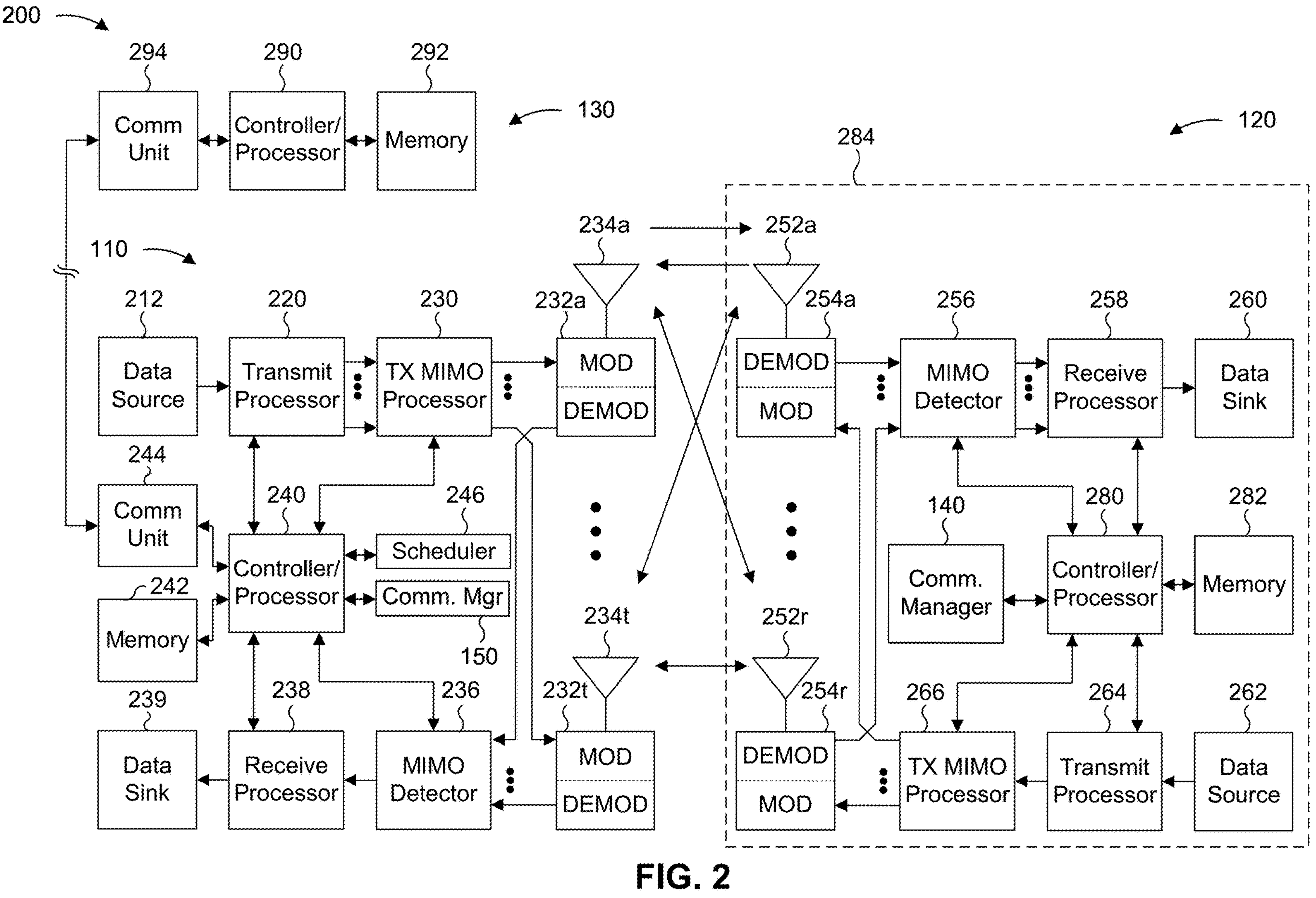
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-7D and/or FIGS. 8-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-7D and/or FIGS. 8-11).

The controller/processor 240 of the network node 110, the controller/processor 280 of the UE 120, and/or any other component(s) of FIG. 2 may perform one or more techniques associated with an SSB design for narrowband operation, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a network node 110, an SSB associated with an SSB configuration for an operating band having a transmission bandwidth that is narrower than a channel bandwidth; and/or means for decoding the SSB based at least in part on the SSB configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for generating an SSB associated with an SSB configuration for an operating band having a transmission bandwidth that is narrower than a channel bandwidth; and/or means for transmitting the SSB associated with the SSB configuration. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
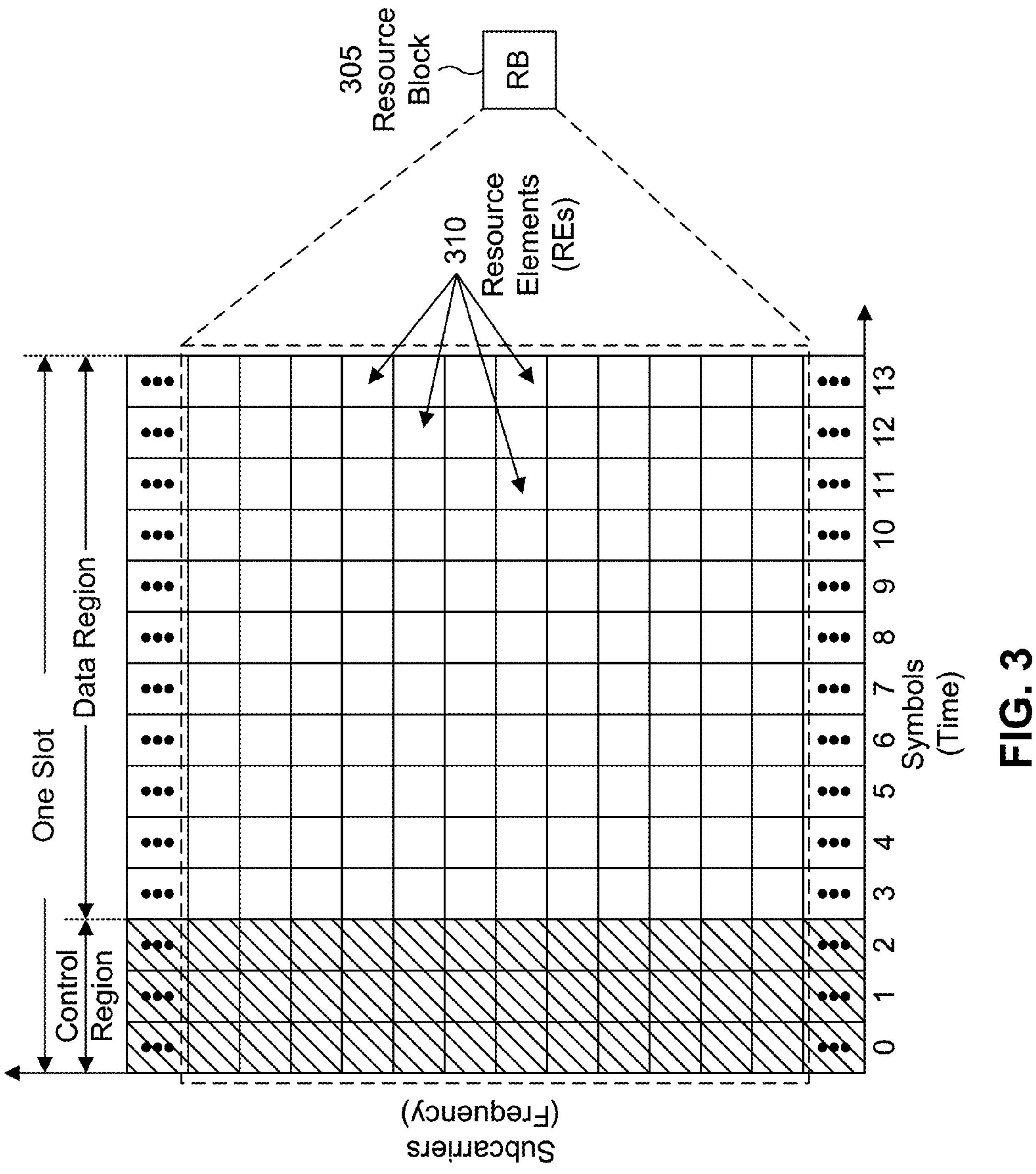
FIG. 3 is a diagram illustrating an example of a resource block (RB) structure, in accordance with the present disclosure.

FIG. 3 is a diagram illustrating an example 300 of an RB structure, in accordance with the present disclosure. As shown in FIG. 3, time-frequency resources in a radio access network may be partitioned into resource blocks, shown by a single RB 305. An RB 305 is sometimes referred to as a physical resource block (PRB). An RB 305 includes a set of subcarriers (e.g., 12 subcarriers) and a set of symbols (e.g., 14 symbols) that are schedulable by a network node 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

As indicated above, FIG. 3 is provided as an example. Other examples may differ from what is described with respect to FIG. 3.

Figure 4:
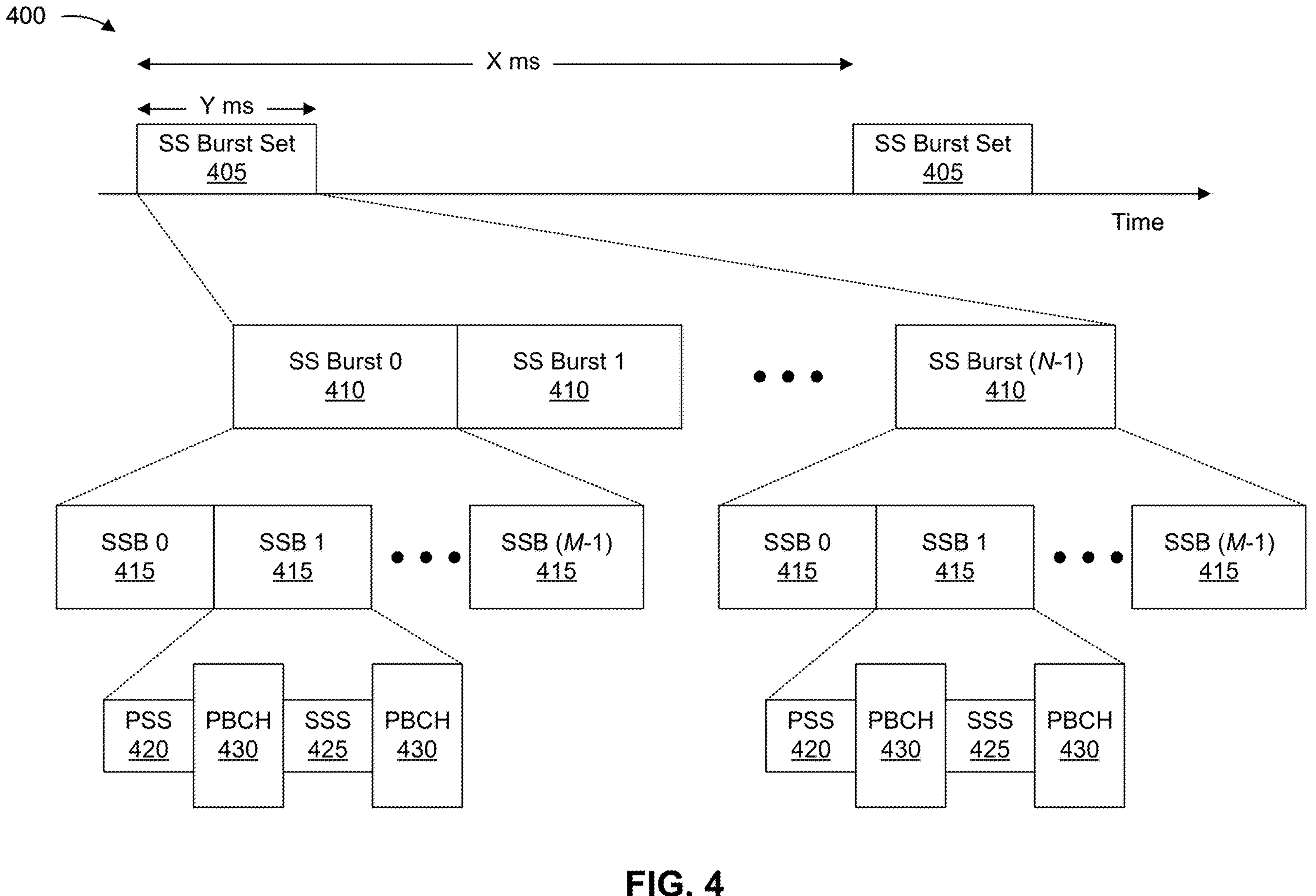
FIG. 4 is a diagram illustrating an example of a synchronization signal hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by a network node. As further shown, each SS burst 410 may include one or more SSBs 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). For example, in some aspects, the network node may transmit multiple SSBs on multiple corresponding beams, and the SSBs may be used for beam selection. An SS burst set 405 may be periodically transmitted by a wireless node (e.g., network node 110), such as every X ms, as shown in FIG. 4. An SS burst set 405 may have a fixed or dynamic length, shown as Y ms in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a PSS 420, an SSS 425, and/or a PBCH 430. In some aspects, the PSS 420, the SSS 425, and the PBCH 430 may carry information used for initial network acquisition and synchronization. In some aspects, the PBCH 430 may include a DMRS, which may carry information used to estimate a radio channel for demodulation of the PBCH 430. The design and mapping of the DMRS may be specific to the PBCH 430 for which the DMRS is used for channel estimation. In some aspects, the DMRS can be beamformed, can be confined in a resource (e.g., rather than transmitted on a wideband), and/or can be transmitted only when necessary. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, as shown in FIG. 4, the symbols of an SSB 415 may be consecutive. Alternatively, in some aspects, the symbols of an SSB 415 may be non-consecutive. Similarly, in some aspects, one or more SSBs 415 of the SS burst 410 may be transmitted in consecutive radio resources (e.g., consecutive symbols) during one or more slots or in non-consecutive radio resources. In some aspects, the SS bursts 410 may have a burst period, and the SSBs 415 of the SS burst 410 may be transmitted by a network node 110 according to the burst period. In this case, the SSBs 415 may be repeated during each SS burst 410. In some aspects, the SS burst set 405 may have a burst set periodicity, whereby the SS bursts 410 of the SS burst set 405 are transmitted by the network node 110 according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., a best RSRP parameter) to a network node 110. The network node 110 and the UE 120 may use the one or more indicated SSBs 415 to select one or more beams to be used for communication between the network node 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4.

Figure 5:
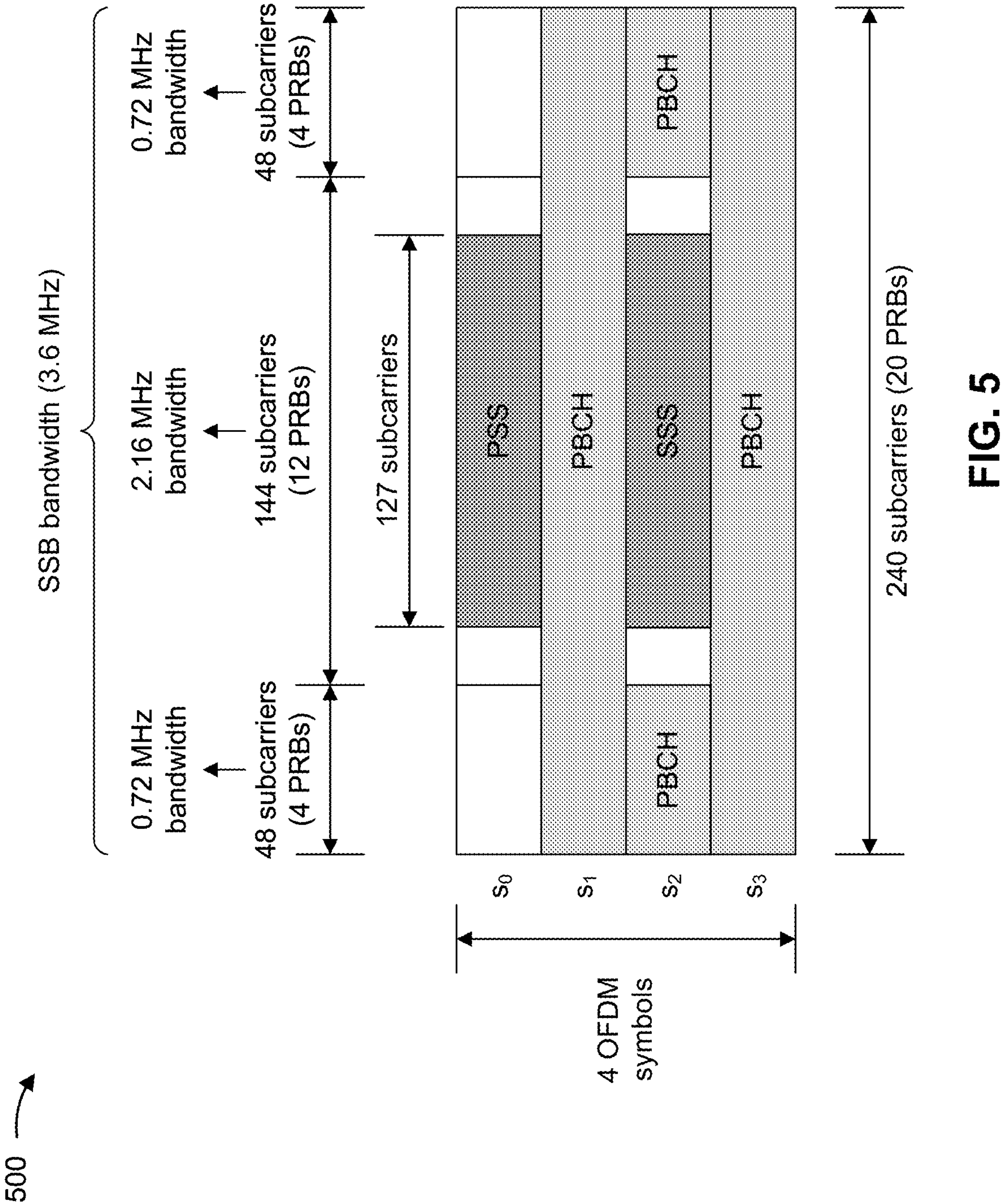
FIG. 5 is a diagram illustrating an example of a synchronization signal block (SSB) configuration, in accordance with the present disclosure.

FIG. 5 is a diagram illustrating an example 500 of an SSB configuration, in accordance with the present disclosure. More particularly, in a wireless network, such as an NR network, a network node periodically broadcasts or otherwise transmits an SSB over an access link (e.g., a Uu interface) to enable initial network acquisition and synchronization for UEs. Additionally, or alternatively, the SSB may be used for cell search on an access link, beam management on an access link, and/or beam selection on an access link, among other examples. For example, as shown in FIG. 5, an SSB includes a PSS, an SSS, and a PBCH carrying information that a UE may use to derive, decode, or otherwise obtain information to access a cell provided by the network node (e.g., a radio frame boundary, a physical cell identity, and/or a MIB that provides parameters to acquire SIB1, among other examples). Furthermore, in some aspects, the PBCH often includes a DMRS that carries a PN sequence or other suitable information to enable a UE to perform channel estimation to demodulate or decode the PBCH.

In general, as shown in FIG. 5, an SSB transmitted on an access link (e.g., a legacy SSB) typically occupies four (4) consecutive symbols in a time domain and includes a PSS, an SSS, and a PBCH spread over 240 subcarriers in a frequency domain (e.g., 20 RBs that each include 12 subcarriers). The PSS typically occupies a first symbol ($s_0$) and spans 127 subcarriers, and the SSS is located in the third symbol ($s_2$) and spans 127 subcarriers, with 8 unused subcarriers above the SSS and 9 unused subcarriers below the SSS. Furthermore, the PBCH typically occupies two full symbols, spanning 240 subcarriers (or 20 RBs) in the second symbol ($s_1$) and 240 subcarriers (or 20 RBs) the fourth symbol ($s_3$), and the PBCH partially occupies the third symbol ($s_2$), spanning 48 subcarriers (or 4 RBs) above the SSS and 48 subcarriers (or 4 RBs) below the SSS, whereby the PBCH occupies 576 subcarriers across three symbols. Furthermore, the PBCH DMRS occupies three (3) REs in each RB allocated to the PBCH, whereby the PBCH DMRS occupies 144 REs across three symbols (e.g., 3 REs in each of 48 RBs allocated to the PBCH) and the remaining 432 REs in the 48 RBs allocated to the PBCH carry the PBCH payload.

As indicated above, FIG. 5 is provided as an example. Other examples may differ from what is described with regard to FIG. 5.

Figure 6:
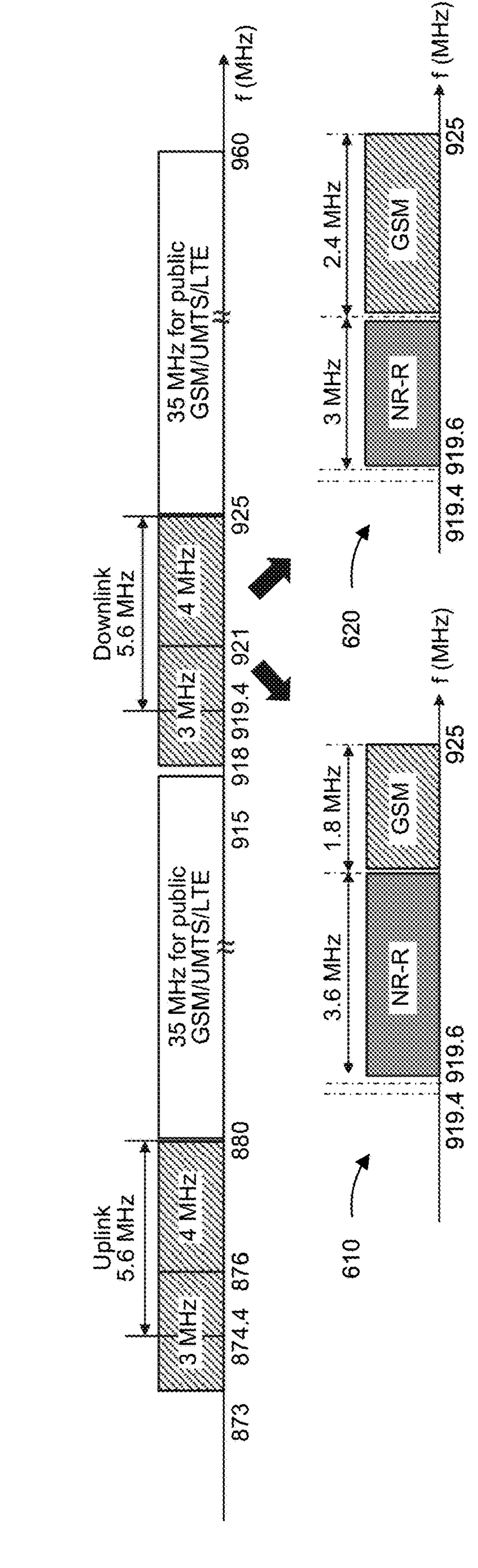
FIG. 6 is a diagram illustrating an example of a frequency band with a narrowband transmission bandwidth, in accordance with the present disclosure.

FIG. 6 is a diagram illustrating an example 600 of a frequency band with a narrowband transmission bandwidth, in accordance with the present disclosure.

In particular, as described above with reference to FIG. 5, a typical (e.g., legacy) SSB configuration is associated with a minimum bandwidth that is based at least in part on a subcarrier spacing. For example, in an NR network, a subcarrier spacing can be 15 kHz, 30 kHz, 60 kHz, or 120 kHz. In cases where a network node communicates in an operating band that uses the lowest possible subcarrier spacing of 15 kHz, each RB may require a bandwidth of 0.18 MHz (e.g., based on each RB including 12 subcarriers). Accordingly, because the SSB spans 240 subcarriers across 20 RBs and the smallest subcarrier spacing supported in an NR network is 15 kHz, the minimum bandwidth for an SSB in an NR network is 3.6 MHz. However, in some cases, a network node may communicate in an operating band having a maximum transmission bandwidth that is narrower than the minimum SSB bandwidth of 3.6 MHz. For example, in some cases, a base station may communicate using FDD in the 900 MHz band (sometimes referred to as the 33-centimeter band), which includes 5 MHz of spectrum between 896-901 MHz and another 5 MHz of spectrum between 935-940 MHz. For example, the network node may be allocated 3 MHz of spectrum to use for uplink communication and 3 MHz of spectrum to use for downlink communication, which is below the minimum SSB bandwidth of 3.6 MHz.

In another example, as shown in FIG. 6, NR Railway (NR-R) may be deployed in an FRMCS band (e.g., the n100 band), which includes 5.6 MHz of spectrum allocated to uplink communication (e.g., from 874.4 MHz to 880 MHz) and 5.6 MHz of spectrum allocated to downlink communication (e.g., from 919.4 MHz to 925 MHz). However, the NR-R operation needs to coexist with GSM-R operation in the FRMCS band, which may occupy 1.8 MHz or 2.4 MHz, effectively limiting the 5.6 MHz channel bandwidth to a 3.6 MHz or 3 MHz transmission bandwidth for the NR-R operation. In this case, the International Union of Railways (UIC) has proposed soft reframing to allocate NR spectrum with a variant bandwidth in the FRMCS band at a lower end of the railway spectrum, and using the remaining spectrum for legacy GSM-R operation. For example, reference number 610 in FIG. 6 depicts a first option, where a 0.2 MHz guard band is provided from 919.4 MHz to 919.6 MHz, NR-R operation is supported in 3.6 MHz of dedicated spectrum starting at 919.6 MHz, and the remaining 1.8 MHz in the FRMCS band is allocated to legacy GSM-R operation. In another example, reference number 620 depicts a second option, NR-R operation is supported in 3 MHz of dedicated spectrum starting at 919.6 MHz, and the remaining 2.4 MHz in the FRMCS band is allocated to legacy GSM-R operation.

Some aspects described herein relate to techniques and apparatuses to enable an SSB configuration for narrowband operation, including SSB configurations for different transmission bandwidths that may enable coexistence with other RATs in the same spectrum (e.g., with GSM-R in the FRMCS n100 band) and maintain backward compatibility with legacy NR operation (e.g., based on a 3.6 MHz transmission bandwidth for an SSB). For example, some aspects described herein relate to SSB configurations that may be used in cases where an available transmission bandwidth for an SSB is 2.16 MHz (or 12 RBs) or 2.7 MHz (or 15 RBs) within a 3 MHz channel bandwidth and/or in cases where an available transmission bandwidth for an SSB is 3.6 MHz (or 20 RBs) within a 5 MHz channel bandwidth. In other words, the SSB configurations described herein may be suitable in cases where a transmission bandwidth is less than 5 MHz. For example, as described herein, some aspects may provide SSB configurations that occupy a bandwidth within the maximum bandwidth of the operating band in cases where the maximum bandwidth of the operating band is narrower than the minimum SSB bandwidth. For example, in some aspects, legacy PSS/SSS configurations may be reused (e.g., where the PSS/SSS occupies 127 subcarriers within a 2.16 MHz bandwidth), and a PBCH may be punctured to fit within the available transmission bandwidth. Furthermore, because PBCH puncturing may potentially impact radio resource management (RRM) measurements, a network node may use power boosting techniques to reduce the impact on RRM measurements.

Furthermore, in addition to providing SSB designs for transmission bandwidths that are less than 5 MHz, some aspects described herein relate to UE behavior for the SSB designs for transmission bandwidths below 5 MHz. In this way, a network node may configure and transmit an SSB that carries the minimum necessary signals to enable access to an NR network (e.g., a PSS, SSS, and PBCH), which may significantly expand the spectrum in which NR can be deployed. For example, by enabling a network node to configure and transmit an SSB that occupies less than the minimum SSB bandwidth, NR can be deployed in low bandwidth spectrum that may be well-suited to cover large areas and/or other limited spectrum (e.g., to enable broadband services in a utility grid private network, a railway system, or other suitable industries).

As indicated above, FIG. 6 is provided as an example. Other examples may differ from what is described with regard to FIG. 6.

FIGS. 7A-7D are diagrams illustrating examples 700 associated with an SSB design for narrowband operation, in accordance with the present disclosure. For example, as described herein, examples 700 relate to SSB designs that may be used for narrowband operation in spectrum associated with a transmission bandwidth that is less than 5 MHz. For example, in some aspects, the SSB designs provided in FIGS. 7A-7D may be used to enable NR operation in spectrum associated with a transmission bandwidth that is less than 5 MHz. For example, as described herein, examples 700 relate to one or more SSB designs may be used in a spectrum allocation associated with a 5 MHz channel bandwidth, in which case the SSB bandwidth (or maximum PBCH bandwidth) may be limited to a 3.6 MHz transmission bandwidth (20 RBs). In addition, examples 700 relate to one or more SSB designs that may be used in a spectrum allocation associated with a 3 MHz channel bandwidth, in which case the SSB bandwidth (or maximum PBCH bandwidth) may be limited to a 2.7 MHz transmission bandwidth (15 RBs) or a 2.16 MHz transmission bandwidth (12 RBs).

Accordingly, as described herein, a network node may generate an SSB associated with an SSB configuration for an operating band having a transmission bandwidth that is narrower than a channel bandwidth, such as a 2.16 MHz or 2.7 MHz transmission bandwidth within a 3 MHz channel bandwidth or a 3.6 MHz transmission bandwidth within a 5 MHz channel bandwidth. In particular, as described herein, the SSB configuration may include a legacy PSS/SSS configurations may be reused (e.g., where the PSS/SSS occupies 12 RBs subcarriers within a 2.16 MHz bandwidth, as shown in FIG. 5), and a PBCH may be punctured to fit within the available transmission bandwidth (e.g., within 12, 15, or 20 RBs, depending on the transmission bandwidth). For example, as described herein, the SSB configuration associated with the SSB may correspond to one or more of the SSB designs shown in FIGS. 7A-7D. Furthermore, the network node may transmit the SSB periodically (e.g., as described above with reference to FIG. 4) to enable initial network access, beam selection, or the like. In some aspects, the SSB may be received by a UE, which may then decode the SSB to obtain initial network access, beam selection, or the like.

For example, as described herein, the UE may decode the SSB based on a synchronization raster associated with the SSB, where the synchronization raster generally indicates a frequency position of the SSB that the UE can use for system acquisition when explicit signaling of the SSB position is not present. For example, the synchronization raster is typically defined for each band, and is a subset of a global synchronization channel number (GSCN). The distance between neighboring synchronization rasters is typically 1, 3, or 16 GSCNs for FR1, or 1 or 2 GSCNs for FR2, except that some bands have a predefined set of GSCNs. Additionally, or alternatively, a global frequency channel raster defines a set of RF reference frequencies, which are used in signaling to identify the positions of RF channels, SSBs, and/or other elements. For example, RF reference frequencies are designated by an absolute radio frequency channel number (ARFCN), which may be in a range from 0 to 2016666 for FR1 or in a range from 2016667 to 3279165 for FR2.

Figure 7A:
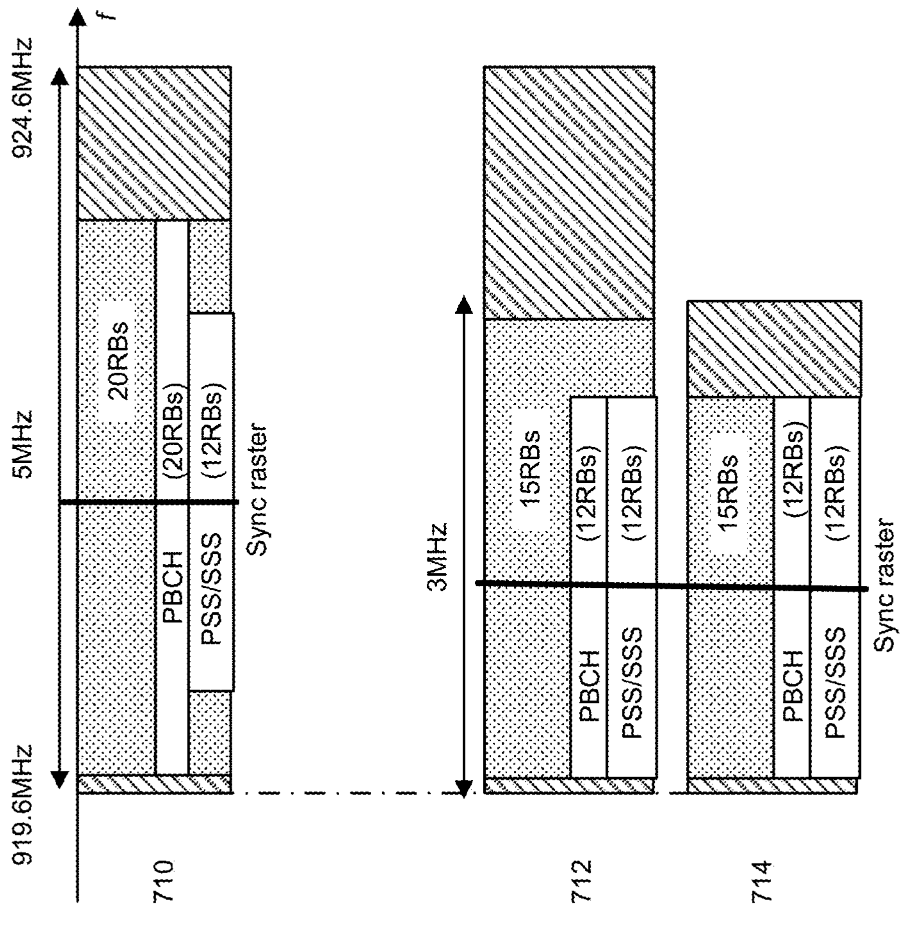

For example, referring to FIG. 7A, reference number 710 depicts a first SSB design and an associated synchronization raster that may be used in scenarios where a channel bandwidth is 5 MHz, and a transmission bandwidth is 3.6 MHz or 20 RBs; reference number 712 depicts a second SSB design and an associated synchronization raster that may be used in scenarios where a channel bandwidth is 3 MHz, a transmission bandwidth is 2.7 MHz or 15 RBs, and an SSB bandwidth is 2.16 MHz or 12 RBs; and reference number 714 depicts a third SSB design and an associated synchronization raster that may be used in scenarios where a channel bandwidth is 3 MHz, a transmission bandwidth is 2.16 MHz or 12 RBs, and an SSB bandwidth is 2.16 MHz or 12 RBs. In this case, as shown by reference number 710, an SSB in a 5 MHz channel bandwidth (and a 3.6 MHz transmission bandwidth) includes a PSS/SSS that occupies 12 RBs, and a non-punctured PBCH that occupies 20 RBs (e.g., the full transmission bandwidth). In some aspects, the SSB design in the 5 MHz channel bandwidth may use a first synchronization raster, where the first synchronization raster may be the same or different from a legacy synchronization raster. For example, in cases where the first synchronization raster associated with the (non-punctured) SSB in the 5 MHz channel bandwidth is the same as a legacy synchronization raster, the first synchronization raster may be indicated by a legacy ARFCN value (e.g., corresponding to a legacy GSCN value defined in Table 5.4.3.1-1 in TS 38.101-1). Alternatively, in cases where the first synchronization raster associated with the non-punctured SSB in the 5 MHz channel bandwidth is different from the legacy synchronization raster, the first synchronization raster associated with the non-punctured SSB in the 5 MHz channel bandwidth may be associated with an offset from the ARFCN value associated with the legacy synchronization raster, an offset from an ARFCN value associated with a second synchronization raster that may be used for a punctured SSB in the 3 MHz channel bandwidth, and/or a separate ARFCN value that corresponds to a GSCN value associated with the 5 MHz channel bandwidth.

Furthermore, as shown by reference numbers 712 and 714, an SSB in a 3 MHz channel bandwidth includes a PSS/SSS that occupies 12 RBs, and a punctured PBCH that occupies 12 RBs (e.g., 4 RBs may be punctured on each end of the PBCH signal carried on the OFDM symbols bearing the PSS/SSS such that the punctured PBCH fits within the same 12 RB bandwidth used for the PSS/SSS). As further shown by reference numbers 712 and 714, the SSBs in the 3 MHz channel bandwidth may be associated with a second synchronization raster, which may be the same regardless of whether the transmission bandwidth is 12 RBs or 15 RBs. For example, the second synchronization raster associated with the punctured SSB in the 3 MHz channel bandwidth may differ from the legacy synchronization raster, and the synchronization raster for the punctured SSB may be indicated by an ARFCN value associated with the 3 MHz channel bandwidth (corresponding to a GSCN value, specified in TS 38.101-1, that specifies the particular frequencies where the SSBs will be placed on a frequency grid). Accordingly, in the designs shown in FIG. 7A, the punctured SSBs and associated synchronization rasters are aligned within the 3 MHz channel bandwidth, regardless of whether the transmission bandwidth is 12 RBs or 15 RBs. In this way, in cases where the transmission bandwidth is 15 RBs, the additional transmission bandwidth (e.g., shown as 3 RBs to the right of the PSS/SSS and the punctured PBCH) can be used for physical channels (e.g., downlink and/or uplink channels, such as a physical downlink control channel (PDCCH), a physical downlink shared channel (PDSCH), a physical uplink control channel (PUCCH), a physical uplink shared channel (PUSCH), or the like).

In some aspects, in cases where the network node generates and transmits an SSB that includes a non-punctured SSB within a 5 MHz channel bandwidth or an SSB that includes a punctured SSB within a 3 MHz channel bandwidth using the SSB configurations shown in FIG. 7A, there may be a one-to-one mapping between a synchronization raster and an SSB bandwidth or SSB puncturing pattern. For example, in cases where the UE detects the PSS/SSS associated with the first synchronization raster used for the 5 MHz channel bandwidth, the UE may assume that the SSB bandwidth is 20 RBs and that the SSB pattern includes a non-punctured PBCH. Alternatively, in cases where the UE detects the PSS/SSS associated with the second synchronization raster used for the 3 MHz channel bandwidth, the UE may assume that the SSB bandwidth is 12 RBs and that the SSB pattern includes a punctured PBCH with 4 RBs punctured on either end of the PSS/SSS. Furthermore, because an SSB bandwidth of 12 RBs can be associated with a 12 RB or a 15 RB transmission bandwidth, the network node may indicate the transmission bandwidth to the UE in cases where the SSB bandwidth is 12 RBs. For example, in some aspects, the transmission bandwidth may be indicated using the PBCH and/or a MIB (e.g., using a control resource set zero (CORESET0) configuration index). Furthermore, when the UE performs intra-frequency measurements on one or more neighbor cells that have the same synchronization raster as a serving cell provided by the network node, the SSB bandwidth of the neighbor cells will have the same SSB bandwidth as the serving cell (e.g., the network node does not need to indicate the SSB bandwidth(s) of the intra-frequency neighbor cell(s) to the UE). However, when the UE performs inter-frequency measurements on one or more neighbor cells that may have a different synchronization raster from the serving cell, the network node may need to explicitly indicate the SSB configuration of the inter-frequency neighbor cells (e.g., an explicit indication encompassing a value of an SSB bandwidth, an SSB puncturing pattern, and/or an SSB power boosting for the inter-frequency neighbor cells) or implicitly indicate the SSB configuration of the inter-frequency neighbor cells (e.g., indicating the synchronization raster associated with the SSB bandwidth, SSB puncturing pattern, and/or SSB power boosting for the inter-frequency neighbor cells).

Figure 7B:
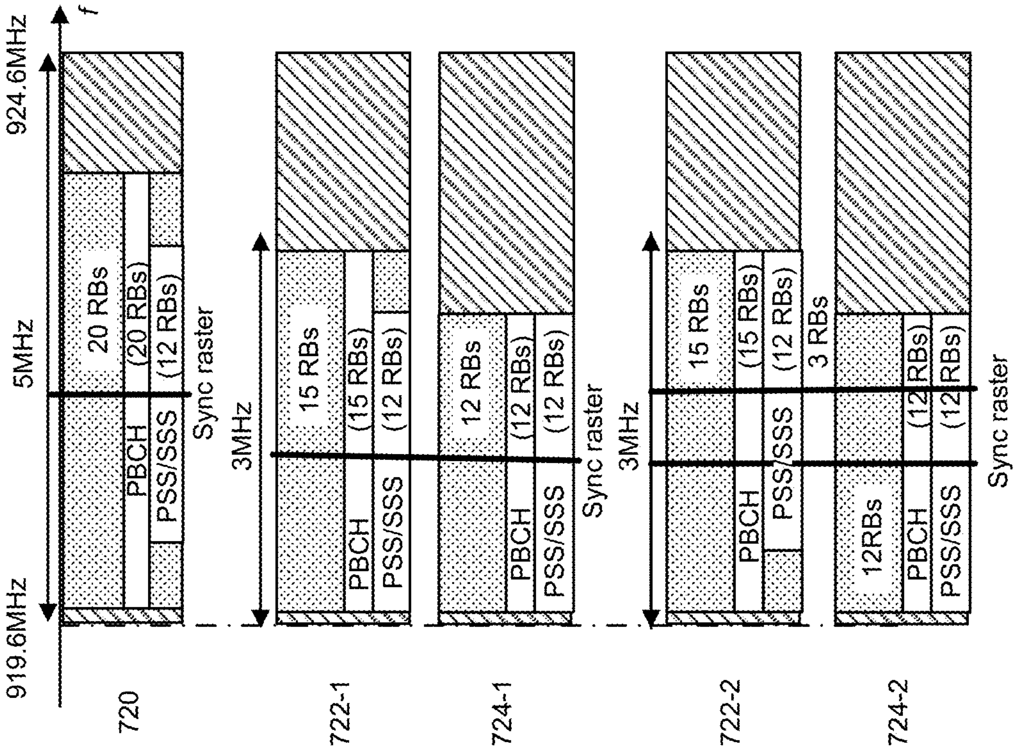

Referring to FIG. 7B, reference number 720 depicts an SSB design and an associated synchronization raster that may be used in a 5 MHz channel bandwidth, reference numbers 722-1 and 724-1 depict a first option for SSB designs and associated synchronization rasters that may be used in a 3 MHz channel bandwidth, and reference numbers 722-2 and 724-2 depict a second option for SSB designs and associated synchronization rasters that may be used in a 3 MHz channel bandwidth. For example, as described herein, the 3 MHz channel bandwidth may be associated with a transmission bandwidth of 15 RBs (e.g., shown by reference numbers 722-1 and 722-2) or with a transmission bandwidth of 12 RBs (e.g., shown by reference numbers 724-1 and 724-2). In this case, the example SSB designs shown in FIG. 7B may differ from the example SSB designs shown in FIG. 7A in that the SSB bandwidth may equal the transmission bandwidth within the 3 MHz channel bandwidth (e.g., whereas the SSB designs in FIG. 7A limit the SSB bandwidth to 12 RBs within the 3 MHz channel bandwidth regardless of whether the transmission bandwidth is 12 RBs or 15 RBs).

In this case, as shown by reference number 720, an SSB in a 5 MHz channel bandwidth (and a 3.6 MHz transmission bandwidth) has a configuration that is generally similar to the SSB design shown by reference number 710 in FIG. 7A. For example, as shown, the SSB in the 5 MHz channel bandwidth includes a PSS/SSS that occupies 12 RBs, and a non-punctured PBCH that occupies 20 RBs (e.g., the full transmission bandwidth). In some aspects, the SSB design in the 5 MHz channel bandwidth may use a first synchronization raster, which is different from a second synchronization raster used for the SSBs in the 3 MHz channel bandwidth. For example, in some aspects, the synchronization raster associated with the non-punctured SSB in the 5 MHz channel bandwidth may be the same or different from a legacy synchronization raster. For example, in some aspects, the first synchronization raster may correspond to the legacy synchronization raster, may correspond to an offset from the legacy synchronization raster, or may correspond to an offset from synchronization raster that may be used for a punctured SSB in the 3 MHz channel bandwidth.

As further shown in FIG. 7B, the SSBs in the 3 MHz channel bandwidth may be associated with synchronization rasters that differ from a legacy synchronization raster. For example, reference numbers 722-1 and 724-1 depict a first option, where the same synchronization raster is used for an SSB associated with a 15 RB transmission bandwidth and an SSB associated with a 12 RB transmission bandwidth. For example, reference number 722-1 depicts an SSB with a 15 RB transmission bandwidth within a 3 MHz channel bandwidth, where the SSB includes a PSS/SSS that occupies 12 RBs and a punctured PBCH that occupies the full 15 RB transmission bandwidth (e.g., with four RBs punctured on a first end of the PSS/SSS and one RB punctured on a second end of the PSS/SSS). Furthermore, reference number 724-1 depicts an SSB within a 12 RB transmission bandwidth within a 3 MHz channel bandwidth, where the SSB includes a PSS/SSS that occupies 12 RBs and a punctured PBCH that occupies the full 12 RB transmission bandwidth (e.g., with four RBs punctured on each end of the PBCH signal carried on the OFDM symbols bearing the PSS/SSS). As further shown by reference numbers 722-1 and 724-1, the SSB associated with the 15 RB transmission bandwidth and the SSB associated with the 12 RB transmission bandwidth are associated with the same synchronization raster.

Alternatively, as shown by reference numbers 722-2 and 724-2, the SSBs in the 3 MHz channel bandwidth may be associated with different synchronization rasters depending on whether the SSB transmission bandwidth is 12 RBs or 15 RBs. For example, reference numbers 722-2 and 724-2 depict a second option, where a synchronization raster used for an SSB associated with a 15 RB transmission bandwidth differs from a synchronization raster used for an SSB associated with a 12 RB transmission bandwidth. For example, as shown in FIG. 7B, different locations for the PSS/SSS within the 3 MHz channel bandwidth may result in different synchronization raster points for transmission bandwidths of 12 RBs and 15 RBs (e.g., the synchronization raster points may be maximally separated by 3 RBs). For example, the PSS/SSS for a transmission bandwidth of 12 RBs may be shifted by 2 RBs relative to the PSS/SSS for a transmission bandwidth of 15 RBs, which may also define a separation between the synchronization raster points associated with the 12 RB and 15 RB transmission bandwidths. For example, the PSS/SSS may be placed at the lower end of the spectrum for an SSB bandwidth of 12 RBs, the legacy SSB (e.g., associated with a 20 RB bandwidth) may include a PSS/SSS having a starting point that is 4 RBs away from the PSS/SSS corresponding to the SSB bandwidth of 12 RBs, and the SSB associated with the SSB bandwidth of 15 RBs may have a PSS/SSS that starts in the middle between the starting point of the PSS/SSS for the SSB having the SSB bandwidth of 12 RBs and the starting point of the PSS/SSS for the (legacy) SSB having the SSB bandwidth of 20 RBs. Accordingly, in some aspects, the SSB puncturing patterns on the lower (left in FIGS. 7A-7D) may be 0 RBs for the legacy configuration of a 20 RB bandwidth, 4 RBs for the SSB bandwidth of 12 RBs, and 2 RBs for the SSB bandwidth of 15 RBs.

Referring to FIG. 7C, reference numbers 730 and 735 illustrate example implementations where the same synchronization raster is used for different transmission bandwidths within the same channel bandwidth. For example, within the 5 MHz channel bandwidth, which is associated with a 20 RB transmission bandwidth, the synchronization raster may correspond to a legacy synchronization raster, an offset from the legacy synchronization raster, or an offset from a synchronization raster used for a 3 MHz channel bandwidth, as described above. Furthermore, the 3 MHz channel bandwidth may be associated with a synchronization raster that is used regardless of whether the transmission bandwidth is 15 RBs or 12 RBs. In this case, as shown in FIG. 7C, the PSS/SSS may have the same location within the 3 MHz channel bandwidth regardless of whether the transmission bandwidth is 15 RBs or 12 RBs, whereby the synchronization raster is aligned for the 12 RB and 15 RB transmission bandwidth. In this way, by using the same synchronization raster for the 12 RB and 15 RB transmission bandwidth, only one synchronization raster needs to be configured for the 3 MHz channel bandwidth that may support different transmission bandwidths.

However, the UE may be unable to determine whether the bandwidth of the punctured PBCH is 12 RBs or 15 RBs without the network node providing an advance indication regarding the transmission bandwidth. For example, for the SSB pattern (e.g., the number of RBs occupied by the PBCH and the puncturing pattern used for the PBCH), the network may generally send an SSB that includes a punctured PBCH that occupies the same number of RBs as the transmission bandwidth (e.g., 12 or 15 RBs), but the UE may be unable to initially determine whether the PBCH occupies 12 or 15 RBs without an advance indication regarding the transmission bandwidth. Accordingly, to maintain coexistence with legacy SSB designs used in NR networks, the synchronization raster for the 3 MHz channel bandwidth may have a maximal distance from the legacy synchronization raster, and the punctured PBCH may be aligned with the PSS/SSS on a first end of the PSS/SSS and punctured on the opposite end of the PSS/SSS to fit within the transmission bandwidth.

For example, reference number 730 depicts a scenario where a starting RB of the PBCH is aligned with a starting RB of the PSS/SSS at a lower end of the spectrum associated with the 3 MHz channel bandwidth to provide a maximal separation from the legacy synchronization raster associated with the 5 MHz channel bandwidth, and the PBCH in the 3 MHz channel bandwidth is punctured on the opposite end of the PSS/SSS (e.g., at higher frequencies) to fit within the applicable transmission bandwidth (e.g., either 12 or 15 RBs). Alternatively, reference number 735 depicts a scenario where an ending RB of the PBCH is aligned with an ending RB of the PSS/SSS at a higher end of the spectrum associated with the 3 MHz channel bandwidth to provide a maximal separation from the legacy synchronization raster associated with the 5 MHz channel bandwidth, and the PBCH in the 3 MHz channel bandwidth is punctured on the opposite end of the PSS/SSS (e.g., at lower frequencies) to fit within the applicable transmission bandwidth (e.g., either 12 or 15 RBs).

In some aspects, in cases where one or more channel bandwidths support different transmission bandwidths, such as the 3 MHz channel bandwidth supporting 12 and 15 RB transmission bandwidths, there is no one-to-one mapping between synchronization rasters and SSB bandwidths or SSB puncturing patterns (e.g., puncturing patterns applied to the PBCH). Accordingly, behavior of the UE within the 3 MHz channel bandwidth relative to cases where there is a one-to-one mapping between a synchronization raster and an SSB bandwidth or SSB puncturing pattern. For example, after the UE detects the PSS/SSS within the 3 MHz channel bandwidth, the UE may initially assume that the SSB bandwidth is 12 RBs (e.g., the minimum number of RBs occupied by the PBCH in the 3 MHz channel bandwidth). Furthermore, in cases where the SSB bandwidth within the 3 MHz channel bandwidth is 15 RBs, the UE may detect that the transmission bandwidth is 15 RBs after determining the SSB bandwidth of the serving cell. For example, in some aspects, the SSB bandwidth of the serving cell may be indicated via a system information block (SIB) (e.g., in cases where the UE is operating in a radio resource control (RRC) idle or inactive state), or via unicast RRC signaling (e.g., in cases where the UE is operating in an RRC connected state). Furthermore, for performing intra-frequency and inter-frequency measurements, the SSB configuration (e.g., including an SSB bandwidth, SSB puncturing pattern, and/or SSB power boosting) of the neighboring cells may need to be indicated explicitly or implicitly because one or more channel bandwidths (e.g., the 3 MHz channel bandwidth) may support multiple SSB bandwidths.

Figure 7D:
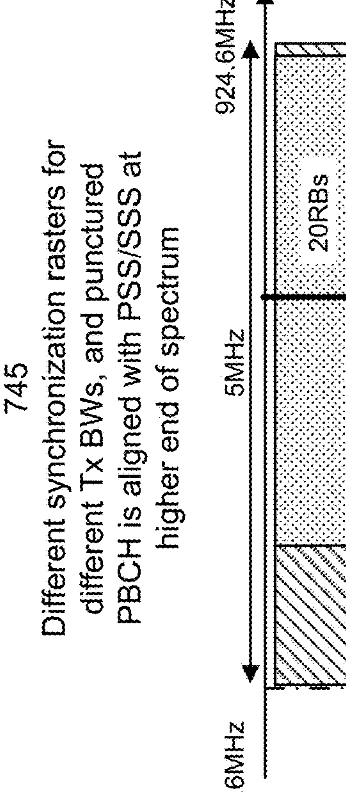

Alternatively, referring to FIG. 7D, reference numbers 740 and 745 illustrate example implementations where different synchronization rasters are used for different transmission bandwidths within the same channel bandwidth. For example, within the 5 MHz channel bandwidth, which is associated with a 20 RB transmission bandwidth, the synchronization raster may correspond to a legacy synchronization raster, an offset from the legacy synchronization raster, or an offset from a synchronization raster used for a 3 MHz channel bandwidth, as described above. However, the 3 MHz channel bandwidth may support different transmission bandwidths (e.g., 12 or 15 RBs), and each transmission bandwidth may be associated with a separate synchronization raster. In this case, as shown in FIG. 7D, the PSS/SSS may have a first center frequency for a transmission bandwidth of 12 RBs or a second center frequency for a transmission bandwidth of 15 RBs, where the first center frequency for 12 RBs is maximally separated from the second center frequency for 15 RBs, and the second center frequency for 15 RBs is maximally separated from a synchronization raster used within a 5 MHz channel bandwidth and/or a 3.6 MHz (or 20 RB) SSB/transmission bandwidth. In this case, the synchronization raster used for each transmission bandwidth may be predefined (e.g., in a wireless communication standard), and the SSB bandwidth and SSB puncturing pattern may be predefined per synchronization raster point. In this way, the UE may have an advance indication regarding the SSB bandwidth and SSB puncturing pattern even when multiple SSB bandwidths are supported in the same channel bandwidth.

However, one challenge that may arise when different synchronization rasters are used for different SSB bandwidths within the same channel bandwidth is that there may be a smaller distance between the legacy synchronization raster (e.g., used for a 5 MHz channel bandwidth or 3.6 MHz SSB bandwidth) and the synchronization rasters used within narrower bandwidths. Accordingly, to maintain coexistence with legacy SSB designs used in NR networks, the synchronization rasters for the 3 MHz channel bandwidth may have a maximal distance from the legacy synchronization raster, and the PBCH may be punctured on each end of the PSS/SSS to provide maximal separation between the synchronization rasters used for SSB bandwidths of 12, 15, and 20 RBs.

For example, reference number 740 depicts a first scenario where the center frequency of the PSS/SSS may be provided at a lower end of the spectrum, and the PBCH is punctured in the 3 MHz channel bandwidth according to an SSB puncturing pattern that provides a maximal separation between synchronization rasters associated with 12 RB, 15 RB, and 20 RB SSB bandwidths. For example, within an SSB bandwidth of 15 RBs, the PBCH may be associated with a puncturing pattern in which 2 RBs are punctured at a first end of the PSS/SSS (e.g., at frequencies below a starting RB of the PSS/SSS) and 3 RBs are punctured at a second end of the PSS/SSS (e.g., at frequencies above an ending RB of the PSS/SSS), which provides a separation of 2 RBs between the synchronization raster for the SSB bandwidth of 15 RBs and the SSB bandwidth of 20 RBs. Furthermore, within an SSB bandwidth of 12 RBs, the PBCH may be associated with a puncturing pattern in which 4 RBs are punctured at the first end of the PSS/SSS (e.g., at frequencies below the starting RB of the PSS/SSS) and 4 RBs are punctured at the second end of the PSS/SSS (e.g., at frequencies above the ending RB of the PSS/SSS), which provides a separation of 2 RBs between the synchronization raster for the SSB bandwidth of 12 RBs and the SSB bandwidth of 15 RBs, and a separation of 4 RBs between the synchronization raster for the SSB bandwidth of 12 RBs and the SSB bandwidth of 20 RBs.

Alternatively, reference number 745 depicts a second scenario where the center frequency of the PSS/SSS may be provided at a higher end of the spectrum, and the PBCH is punctured in the 3 MHz channel bandwidth according to an SSB puncturing pattern that provides a maximal separation between synchronization rasters associated with 12 RB, 15 RB, and 20 RB SSB bandwidths. For example, within an SSB bandwidth of 15 RBs, the PBCH may be associated with a puncturing pattern in which 3 RBs are punctured at the first end of the PSS/SSS (e.g., at frequencies below the starting RB of the PSS/SSS) and 2 RBs are punctured at the second end of the PSS/SSS (e.g., at frequencies above the ending RB of the PSS/SSS), which provides a separation of 2 RBs between the synchronization raster for the SSB bandwidth of 15 RBs and the SSB bandwidth of 20 RBs. Furthermore, within the SSB bandwidth of 12 RBs, the PBCH may be associated with a puncturing pattern in which 4 RBs are punctured at the first end of the PSS/SSS (e.g., at frequencies below the starting RB of the PSS/SSS) and 4 RBs are punctured at the second end of the PSS/SSS (e.g., at frequencies above the ending RB of the PSS/SSS), which provides a separation of 2 RBs between the synchronization raster for the SSB bandwidth of 12 RBs and the SSB bandwidth of 15 RBs, and a separation of 4 RBs between the synchronization raster for the SSB bandwidth of 12 RBs and the SSB bandwidth of 20 RBs.

In some aspects, in cases where one or more channel bandwidths support different transmission bandwidths and different synchronization rasters are used per transmission bandwidth, there is a one-to-one mapping between synchronization rasters and the SSB bandwidths or SSB puncturing patterns (e.g., puncturing patterns applied to the PBCH). Accordingly, when a different synchronization raster is used per SSB bandwidth, the UE can determine the SSB pattern based on the synchronization raster without having to perform blind detection for different SSB patterns. Nonetheless, in some aspects, the network node may indicate the SSB bandwidth of the serving cell in a SIB as assistance information to reduce UE complexity and/or mitigate the impact of sensitivities to RF imperfections. Furthermore, for performing intra-frequency measurements on one or more neighbor cells that have the same synchronization raster as the serving cell, the SSB bandwidth of the neighbor cells may be the same as the SSB bandwidth of the serving cell, whereby the network node does not need to indicate the SSB bandwidth of the neighbor cells that have the same synchronization raster as the serving cell. However, for inter-frequency neighbor cells where the synchronization raster may differ from the serving cell, the SSB configuration (e.g., SSB bandwidth, SSB puncturing pattern, and/or SSB power boosting) of the inter-frequency neighbor cells may be explicitly or implicitly indicated.

In some aspects, as described herein, there are various circumstances where a network node that provides a serving cell needs to indicate the SSB bandwidth of one or more neighbor cells to the UE in order to enable intra-frequency RRM measurements and/or inter-frequency RRM measurements on the neighbor cells. For example, in cases where a neighbor cell uses the same synchronization raster as the serving cell (e.g., a synchronization raster associated with the same ARFCN value), an implicit indication of the SSB bandwidth of the neighbor cell may indicate that the SSB bandwidth of the neighbor cell is the same as the SSB bandwidth of the serving cell. Alternatively, in cases where a neighbor cell uses a synchronization raster that differs from the serving cell (e.g., the synchronization raster of the neighbor cell is associated with an ARFCN value that differs from an ARFCN value of the serving cell), the ARFCN value of the neighbor cell may differ from a legacy ARFCN value within a defined GSCN range (e.g., in TS 38.101-1, Table 5.4.3.1-1). In this case, a GSCN value and corresponding SSB bandwidth may be defined and associated with an ARFCN value for the neighbor cell, which may enable the UE to determine the SSB bandwidth of the neighbor cell when the ARFCN value is indicated for the neighbor cell. For example, in an NR network, SIB4 is typically used to indicate an inter-frequency cell configuration, which includes a downlink carrier frequency associated with a particular ARFCN value. Accordingly, a GSCN value and corresponding SSB bandwidth may be defined for an ARFCN value associated with the neighbor cell (e.g., an SSB bandwidth of 12 or 15 RBs may be defined for the GSCN value), and SIB4 may include a parameter to indicate an inter-frequency carrier frequency list, where a downlink carrier frequency parameter indicates the ARFCN value for the neighbor cell. In this case, the inter-frequency carrier frequency list may apply only to UEs that support communicating in a transmission bandwidth that is less than 5 MHz, and may have no impact on (e.g., may be ignored by) legacy UEs that lack support for communicating in a transmission bandwidth that is less than 5 MHz.

Alternatively, in cases where the SSB bandwidth of one or more neighbor cells is indicated explicitly, the SSB bandwidth of the neighbor cell(s) (e.g., whether larger or smaller than the SSB bandwidth of the serving cell) may be indicated in a SIB (e.g., SIB2 or SIB4 for intra-frequency or inter-frequency neighbor cells) or according to a neighbor cell measurement configuration, which can be configured per cell or per cell group. For example, in some aspects, a cell list or a cell group list may indicate an SSB bandwidth per cell, or may include a flag to indicate whether the SSB bandwidth for the neighbor cell is greater than or less than the SSB bandwidth for the serving cell (e.g., in cases where there are only two SSB bandwidth options for the serving cell, such that the flag provides a one-to-one mapping between the SSB bandwidth of the serving cell and the SSB bandwidth of the neighbor cell). For example, in some aspects, the network node may use a SIB or unicast RRC signaling to indicate the SSB bandwidth of the serving cell (e.g., whether the SSB bandwidth is the same or smaller than a CORESET0 bandwidth) for RRM measurements performed by the UE and/or whether the SSB bandwidth of the serving cell is the same as or different from the SSB bandwidth of the neighbor cell. For example, the SSB configuration of the neighbor cell may be indicated in a measurement object for the serving and/or neighbor cell in cases where the UE is operating in an RRC connected state, or the SSB bandwidth of the neighbor cell may be indicated in SIB2 in cases where the UE is operating in an RRC idle or RRC inactive state. Additionally, or alternatively, an SSB measurement timing configuration (SMTC) parameter or a variant thereof may be used to configure one or more timing occasions at which the UE measures SSBs to obtain link quality metrics (e.g., RSRP, RSRQ, or other suitable measurements). In this case, the SMTC parameter may further indicate an SSB configuration per cell or per cell group, or may indicate whether the SSB bandwidth of the neighbor cell is the same as or different from the SSB bandwidth of the serving cell. Furthermore, the supported SSB bandwidths may be configured for one or more frequency bands (e.g., the n100 band) but may not be needed for other bands (e.g., in n8, 26, n28) with the same channel bandwidth. In such cases, the network node may send SSBs with a PBCH that occupies 15 RBs for the n8, n26, n28, or other suitable bands, and the UE may be required only to receive 15 RBs (e.g., associated with a known puncturing pattern).

As indicated above, FIGS. 7A-7D are provided as examples. Other examples may differ from what is described with regard to FIGS. 7A-7D.

Figure 8:
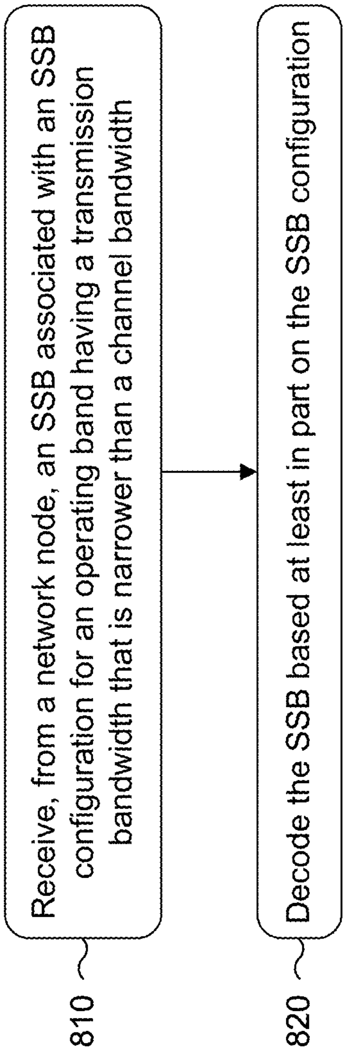
FIGS. 8-9 are diagrams illustrating example processes associated with an SSB design for narrowband operation, in accordance with the present disclosure.

FIG. 8 is a diagram illustrating an example process 800 performed, for example, by a UE, in accordance with the present disclosure. Example process 800 is an example where the UE (e.g., UE 120) performs operations associated with an SSB design for narrowband operation.

As shown in FIG. 8, in some aspects, process 800 may include receiving, from a network node, an SSB associated with an SSB configuration for an operating band having a transmission bandwidth that is narrower than a channel bandwidth (block 810). For example, the UE (e.g., using reception component 1002 and/or communication manager 1006, depicted in FIG. 10) may receive, from a network node, an SSB associated with an SSB configuration for an operating band having a transmission bandwidth that is narrower than a channel bandwidth, as described above.

As further shown in FIG. 8, in some aspects, process 800 may include decoding the SSB based at least in part on the SSB configuration (block 820). For example, the UE (e.g., using communication manager 1006, depicted in FIG. 10) may decode the SSB based at least in part on the SSB configuration, as described above.

Process 800 may include additional aspects, such as any single aspect or any combination of aspects described below and/or in connection with one or more other processes described elsewhere herein.

In a first aspect, the SSB includes a punctured PBCH, and a PSS/SSS associated with a synchronization raster that is indicated by an ARFCN value associated with the channel bandwidth.

In a second aspect, alone or in combination with the first aspect, the ARFCN value associated with the SSB corresponds to a GSCN value that differs from a GSCN value associated with an SSB that includes a non-punctured PBCH.

In a third aspect, alone or in combination with one or more of the first and second aspects, the synchronization raster is based at least in part on a location of the PSS and the SSS within the SSB.

In a fourth aspect, alone or in combination with one or more of the first through third aspects, the punctured PBCH is punctured at a first end to be aligned with an RB at a first end of a PSS and an SSS.

In a fifth aspect, alone or in combination with one or more of the first through fourth aspects, the punctured PBCH is punctured at a second end of the PSS and the SSS to fit within the transmission bandwidth.

In a sixth aspect, alone or in combination with one or more of the first through fifth aspects, the SSB includes a PSS and an SSS, the PSS and the SSS associated with a first center frequency that is maximally separated from a second center frequency of a PSS and an SSS associated with an SSB in an operating band having a wider or narrower transmission bandwidth than the operating band associated with the received SSB.

In a seventh aspect, alone or in combination with one or more of the first through sixth aspects, the SSB includes a non-punctured PBCH, and a PSS and an SSS associated with a synchronization raster that is indicated by an ARFCN value associated with the channel bandwidth, different from an ARFCN value associated with a different channel bandwidth.

In an eighth aspect, alone or in combination with one or more of the first through seventh aspects, the SSB includes a punctured PBCH within a first transmission bandwidth associated with the SSB and with a synchronization raster that is indicated by an ARFCN value associated with the channel bandwidth, different from an ARFCN value associated with the punctured PBCH within a second transmission bandwidth associated with the SSB in a same size of the channel bandwidth.

In a ninth aspect, alone or in combination with one or more of the first through eighth aspects, decoding the SSB includes determining a number of RBs included in the SSB based at least in part on a synchronization raster associated with a PSS and an SSS detected in the SSB.

In a tenth aspect, alone or in combination with one or more of the first through ninth aspects, the transmission bandwidth is indicated in a MIB associated with a PBCH carried in the SSB.

In an eleventh aspect, alone or in combination with one or more of the first through tenth aspects, process 800 includes receiving an SSB from a neighbor cell, and obtaining one or more RRM measurements associated with the SSB received from the neighbor cell based at least in part on an indication of a configuration associated with the SSB received from the neighbor cell.

In a twelfth aspect, alone or in combination with one or more of the first through eleventh aspects, the configuration associated with the SSB received from the neighbor cell includes a transmission bandwidth that equals the transmission bandwidth associated with the SSB received from the network node based at least in part on the neighbor cell and the network node sharing a synchronization raster associated with a frequency band.

In a thirteenth aspect, alone or in combination with one or more of the first through twelfth aspects, the configuration associated with the SSB received from the neighbor cell is based at least in part on an ARFCN value indicated for the neighbor cell.

In a fourteenth aspect, alone or in combination with one or more of the first through thirteenth aspects, the configuration associated with the SSB received from the neighbor cell is indicated in a system information block or a measurement configuration associated with the neighbor cell.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:

FIG. 9 is a diagram illustrating an example process 900 performed, for example, by a network node, in accordance with the present disclosure. Example process 900 is an example where the network node (e.g., network node 110) performs operations associated with an SSB design for narrowband operation.

As shown in FIG. 9, in some aspects, process 900 may include generating an SSB associated with an SSB configuration for an operating band having a transmission bandwidth that is narrower than a channel bandwidth (block 910). For example, the network node (e.g., using communication manager 1106, depicted in FIG. 11) may generate an SSB associated with an SSB configuration for an operating band having a transmission bandwidth that is narrower than a channel bandwidth, as described above.

As further shown in FIG. 9, in some aspects, process 900 may include transmitting the SSB associated with the SSB configuration (block 920). For example, the network node (e.g., using transmission component 1104 and/or communication manager 1106, depicted in FIG. 11) may transmit the SSB associated with the SSB configuration, as described above.

Process 900 may include additional aspects, such as any single aspect or any combination of aspects described below and/or in connection with one or more other processes described elsewhere herein.

In a first aspect, the SSB includes a punctured PBCH, and a PSS and an SSS associated with a synchronization raster that is indicated by an ARFCN value associated with the channel bandwidth.

In a second aspect, alone or in combination with the first aspect, the ARFCN value associated with the SSB corresponds to a GSCN value that differs from a GSCN value associated with an SSB that includes a non-punctured PBCH.

In a third aspect, alone or in combination with one or more of the first and second aspects, the synchronization raster is based at least in part on a location of the PSS and the SSS within the SSB.

In a fourth aspect, alone or in combination with one or more of the first through third aspects, the punctured PBCH is punctured at a first end to be aligned with an RB at a first end of a PSS and an SSS.

In a fifth aspect, alone or in combination with one or more of the first through fourth aspects, the punctured PBCH is punctured at a second end of the PSS and the SSS to fit within the transmission bandwidth.

In a sixth aspect, alone or in combination with one or more of the first through fifth aspects, the SSB includes a PSS and an SSS, the PSS and the SSS associated with a first center frequency that is maximally separated from a second center frequency of a PSS and an SSS associated with an SSB in an operating band having a wider or narrower transmission bandwidth than the operating band associated with the received SSB.

In a seventh aspect, alone or in combination with one or more of the first through sixth aspects, the SSB includes a non-punctured PBCH, and a PSS and an SSS associated with a synchronization raster that is indicated by an ARFCN value associated with the channel bandwidth, different from an ARFCN value associated with a different channel bandwidth.

In an eighth aspect, alone or in combination with one or more of the first through seventh aspects, the SSB includes a punctured PBCH within a first transmission bandwidth associated with the SSB and with a synchronization raster that is indicated by an ARFCN value associated with the channel bandwidth, different from an ARFCN value associated with the punctured PBCH within a second transmission bandwidth associated with the SSB in a same size of the channel bandwidth.

In a ninth aspect, alone or in combination with one or more of the first through eighth aspects, the transmission bandwidth is indicated in a MIB associated with a PBCH carried in the SSB.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
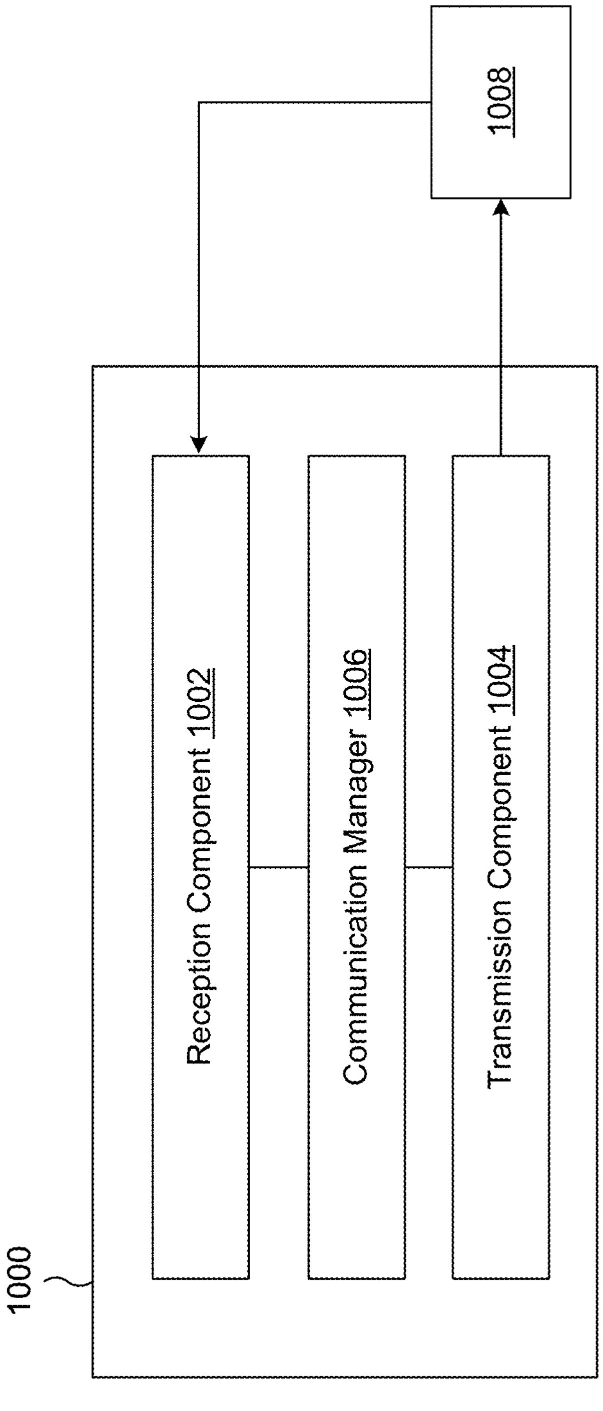
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 7A-7D. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive, from a network node, an SSB associated with an SSB configuration for an operating band having a transmission bandwidth that is narrower than a channel bandwidth. The communication manager 1006 may decode the SSB based at least in part on the SSB configuration.

The reception component 1002 may receive an SSB from a neighbor cell. The reception component 1002 may obtain one or more RRM measurements associated with the SSB received from the neighbor cell based at least in part on an indication of a configuration associated with the SSB received from the neighbor cell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
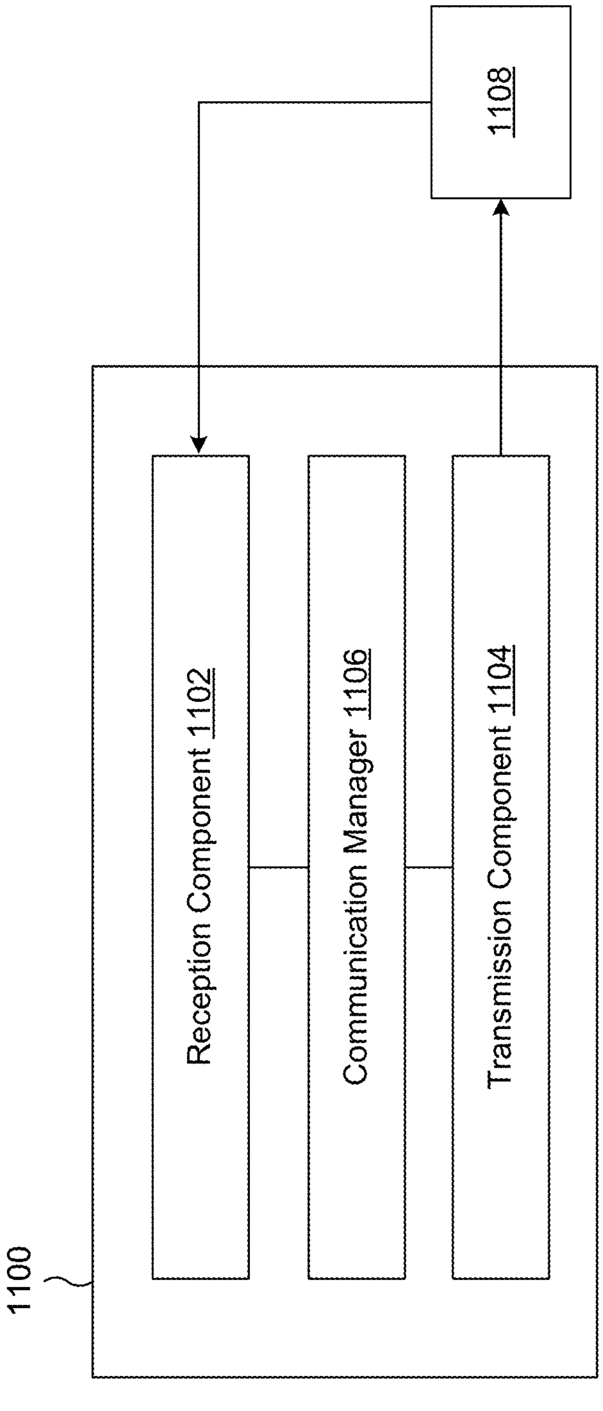

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 7A-7D. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may generate an SSB associated with an SSB configuration for an operating band having a transmission bandwidth that is narrower than a channel bandwidth. The transmission component 1104 may transmit the SSB associated with the SSB configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving, from a network node, an SSB associated with an SSB configuration for an operating band having a transmission bandwidth that is narrower than a channel bandwidth; and decoding the SSB based at least in part on the SSB configuration.

Aspect 2: The method of Aspect 1, wherein the SSB includes: a punctured PBCH, and a PSS and an SSS associated with a synchronization raster that is indicated by an ARFCN value associated with the channel bandwidth.

Aspect 3: The method of Aspect 2, wherein the ARFCN value associated with the SSB corresponds to a GSCN value that differs from a GSCN value associated with an SSB that includes a non-punctured PBCH.

Aspect 4: The method of Aspect 2, wherein the synchronization raster is based at least in part on a location of the PSS and the SSS within the SSB.

Aspect 5: The method of Aspect 2, wherein the punctured PBCH is punctured at a first end to be aligned with an RB at a first end of a PSS and an SSS.

Aspect 6: The method of Aspect 5, wherein the punctured PBCH is punctured at a second end of the PSS and the SSS to fit within the transmission bandwidth.

Aspect 7: The method of Aspect 2, wherein the SSB includes a PSS and an SSS, the PSS and the SSS associated with a first center frequency that is maximally separated from a second center frequency of a PSS and an SSS associated with an SSB in an operating band having a wider or narrower transmission bandwidth than the operating band associated with the received SSB.

Aspect 8: The method of any of Aspects 1-7, wherein the SSB includes: a non-punctured PBCH, and a PSS and an SSS associated with a synchronization raster that is indicated by an ARFCN value associated with the channel bandwidth, different from an ARFCN value associated with a different channel bandwidth.

Aspect 9: The method of any of Aspects 1-8, wherein the SSB includes a punctured PBCH within a first transmission bandwidth associated with the SSB and with a synchronization raster that is indicated by an ARFCN value associated with the channel bandwidth, different from an ARFCN value associated with the punctured PBCH within a second transmission bandwidth associated with the SSB in a same size of the channel bandwidth.

Aspect 10: The method of any of Aspects 1-9, wherein decoding the SSB includes determining a number of RBs included in the SSB based at least in part on a synchronization raster associated with a PSS and an SSS detected in the SSB.

Aspect 11: The method of any of Aspects 1-10, wherein the transmission bandwidth is indicated in a MIB associated with a PBCH carried in the SSB.

Aspect 12: The method of any of Aspects 1-11, further comprising: receiving an SSB from a neighbor cell; and obtaining one or more RRM measurements associated with the SSB received from the neighbor cell based at least in part on an indication of a configuration associated with the SSB received from the neighbor cell.

Aspect 13: The method of Aspect 12, wherein the configuration associated with the SSB received from the neighbor cell includes a transmission bandwidth that equals the transmission bandwidth associated with the SSB received from the network node based at least in part on the neighbor cell and the network node sharing a synchronization raster associated with a frequency band.

Aspect 14: The method of Aspect 12, wherein the configuration associated with the SSB received from the neighbor cell is based at least in part on an ARFCN value indicated for the neighbor cell.

Aspect 15: The method of Aspect 12, wherein the configuration associated with the SSB received from the neighbor cell is indicated in a SIB or a measurement configuration associated with the neighbor cell.

Aspect 16: A method of wireless communication performed by a network node, comprising: generating an SSB associated with an SSB configuration for an operating band having a transmission bandwidth that is narrower than a channel bandwidth; and transmitting the SSB associated with the SSB configuration.

Aspect 17: The method of Aspect 16, wherein the SSB includes: a punctured PBCH, and a PSS and an SSS associated with a synchronization raster that is indicated by an ARFCN value associated with the channel bandwidth.

Aspect 18: The method of Aspect 17, wherein the ARFCN value associated with the SSB corresponds to a GSCN value that differs from a GSCN value associated with an SSB that includes a non-punctured PBCH.

Aspect 19: The method of Aspect 17, wherein the synchronization raster is based at least in part on a location of the PSS and the SSS within the SSB.

Aspect 20: The method of Aspect 17, wherein the punctured PBCH is punctured at a first end to be aligned with an RB at a first end of a PSS and an SSS.

Aspect 21: The method of Aspect 20, wherein the punctured PBCH is punctured at a second end of the PSS and the SSS to fit within the transmission bandwidth.

Aspect 22: The method of Aspect 17, wherein the SSB includes a PSS and an SSS, the PSS and the SSS associated with a first center frequency that is maximally separated from a second center frequency of a PSS and an SSS associated with an SSB in an operating band having a wider or narrower transmission bandwidth than the operating band associated with the received SSB.

Aspect 23: The method of any of Aspects 16-22, wherein the SSB includes: a non-punctured PBCH, and a PSS and an SSS associated with a synchronization raster that is indicated by an ARFCN value associated with the channel bandwidth, different from an ARFCN value associated with a different channel bandwidth.

Aspect 24: The method of any of Aspects 16-23, wherein the SSB includes a punctured PBCH within a first transmission bandwidth associated with the SSB and with a synchronization raster that is indicated by an ARFCN value associated with the channel bandwidth, different from an ARFCN value associated with the punctured PBCH within a second transmission bandwidth associated with the SSB in a same size of the channel bandwidth.

Aspect 25: The method of any of Aspects 16-24, wherein the transmission bandwidth is indicated in a MIB associated with a PBCH carried in the SSB.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving, from a network node, a synchronization signal block (SSB) associated with an SSB configuration for an operating band having a transmission bandwidth that is narrower than a channel bandwidth, wherein the SSB includes:

a punctured physical broadcast channel (PBCH), and a primary synchronization signal (PSS) and a secondary synchronization signal (SSS) associated with a synchronization raster that is indicated by an absolute radio frequency channel number (ARFCN) value associated with the channel bandwidth wherein the ARFCN value associated with the SSB corresponds to a global synchronization channel number (GSCN) value that differs from a GSCN value associated with an SSB that includes a non-punctured PBCH; and decoding the SSB based at least in part on the SSB configuration.

2. The method of claim 1, wherein the synchronization raster is based at least in part on a location of the PSS and the SSS within the SSB.

3. The method of claim 1, wherein the punctured PBCH is punctured at a first end to be aligned with a resource block (RB) at a first end of a primary synchronization signal (PSS) and a secondary synchronization signal (SSS).

4. The method of claim 3, wherein the punctured PBCH is punctured at a second end of the PSS and the SSS to fit within the transmission bandwidth.

5. The method of claim 1, wherein the SSB includes a primary synchronization signal (PSS) and a secondary synchronization signal (SSS), the PSS and the SSS associated with a first center frequency that is maximally separated from a second center frequency of a PSS and an SSS associated with an SSB in an operating band having a wider or narrower transmission bandwidth than the operating band associated with the received SSB.

6. The method of claim 1, wherein the SSB includes:

a non-punctured physical broadcast channel (PBCH), and a primary synchronization signal (PSS) and a secondary synchronization signal (SSS) associated with a synchronization raster that is indicated by an absolute radio frequency channel number (ARFCN) value associated with the channel bandwidth, different from an ARFCN value associated with a different channel bandwidth.

7. The method of claim 1, wherein the SSB includes a punctured physical broadcast channel (PBCH) within a first transmission bandwidth associated with the SSB and with a synchronization raster that is indicated by an absolute radio frequency channel number (ARFCN) value associated with the channel bandwidth, different from an ARFCN value associated with the punctured PBCH within a second transmission bandwidth associated with the SSB in a same size of the channel bandwidth.

8. The method of claim 1, wherein decoding the SSB includes determining a number of resource blocks (RBs) included in the SSB based at least in part on a synchronization raster associated with a primary synchronization signal (PSS) and a secondary synchronization signal (SSS) detected in the SSB.

9. The method of claim 1, wherein the transmission bandwidth is indicated in a master information block (MIB) associated with a physical broadcast channel (PBCH) carried in the SSB.

10. The method of claim 1, further comprising:

receiving an SSB from a neighbor cell; and obtaining one or more radio resource management (RRM) measurements associated with the SSB received from the neighbor cell based at least in part on an indication of a configuration associated with the SSB received from the neighbor cell.

11. The method of claim 10, wherein the configuration associated with the SSB received from the neighbor cell includes a transmission bandwidth that equals the transmission bandwidth associated with the SSB received from the network node based at least in part on the neighbor cell and the network node sharing a synchronization raster associated with a frequency band.

12. The method of claim 10, wherein the configuration associated with the SSB received from the neighbor cell is based at least in part on an absolute radio frequency channel number (ARFCN) value indicated for the neighbor cell.

13. The method of claim 10, wherein the configuration associated with the SSB received from the neighbor cell is indicated in a system information block or a measurement configuration associated with the neighbor cell.

14. A method of wireless communication performed by a network node, comprising:

generating a synchronization signal block (SSB) associated with an SSB configuration for an operating band having a transmission bandwidth that is narrower than a channel bandwidth; wherein the SSB includes:

a punctured physical broadcast channel (PBCH), and a primary synchronization signal (PSS) and a secondary synchronization signal (SSS) associated with a synchronization raster that is indicated by an absolute radio frequency channel number (ARFCN) value associated with the channel bandwidth and wherein the ARFCN value associated with the SSB corresponds to a global synchronization channel number (GSCN) value that differs from a GSCN value associated with an SSB that includes a non-punctured PBCH; and transmitting the SSB associated with the SSB configuration.

15. The method of claim 14, wherein the synchronization raster is based at least in part on a location of the PSS and the SSS within the SSB.

16. The method of claim 14, wherein the punctured PBCH is punctured at a first end to be aligned with a resource block (RB) at a first end of a primary synchronization signal (PSS) and a secondary synchronization signal (SSS).

17. The method of claim 16, wherein the punctured PBCH is punctured at a second end of the PSS and the SSS to fit within the transmission bandwidth.

18. The method of claim 14, wherein the SSB includes a primary synchronization signal (PSS) and a secondary synchronization signal (SSS), the PSS and the SSS associated with a first center frequency that is maximally separated from a second center frequency of a PSS and an SSS associated with an SSB in an operating band having a wider or narrower transmission bandwidth than the operating band associated with the transmitted SSB.

19. The method of claim 14, wherein the SSB includes:

a non-punctured physical broadcast channel (PBCH), and a primary synchronization signal (PSS) and a secondary synchronization signal (SSS) associated with a synchronization raster that is indicated by an absolute radio frequency channel number (ARFCN) value associated with the channel bandwidth, different from an ARFCN value associated with a different channel bandwidth.

20. The method of claim 14, wherein the SSB includes a punctured physical broadcast channel (PBCH) within a first transmission bandwidth associated with the SSB and with a synchronization raster that is indicated by an absolute radio frequency channel number (ARFCN) value associated with the channel bandwidth, different from an ARFCN value associated with the punctured PBCH within a second transmission bandwidth associated with the SSB in a same size of the channel bandwidth.

21. The method of claim 14, wherein the transmission bandwidth is indicated in a master information block (MIB) associated with a physical broadcast channel (PBCH) carried in the SSB.

22. A user equipment (UE) for wireless communication, comprising:

a memory; and one or more processors, coupled to the memory, configured to:

receive, from a network node, a synchronization signal block (SSB) associated with an SSB configuration for an operating band having a transmission bandwidth that is narrower than a channel bandwidth; wherein the SSB includes:

a non-punctured physical broadcast channel (PBCH), and a primary synchronization signal (PSS) and a secondary synchronization signal (SSS) associated with a synchronization raster that is indicated by an absolute radio frequency channel number (ARFCN) value associated with the channel bandwidth, different from an ARFCN value associated with a different channel bandwidth; and decode the SSB based at least in part on the SSB configuration.

23. The UE of claim 22, wherein the SSB includes:

a punctured physical broadcast channel (PBCH), and a primary synchronization signal (PSS) and a secondary synchronization signal (SSS) associated with a synchronization raster that is indicated by an absolute radio frequency channel number (ARFCN) value associated with the channel bandwidth.

24. The UE of claim 22, wherein the SSB includes a punctured physical broadcast channel (PBCH) within a first transmission bandwidth associated with the SSB and with a synchronization raster that is indicated by an absolute radio frequency channel number (ARFCN) value associated with the channel bandwidth, different from an ARFCN value associated with the punctured PBCH within a second transmission bandwidth associated with the SSB in a same size of the channel bandwidth.

25. A network node for wireless communication, comprising:

a memory; and one or more processors, coupled to the memory, configured to:

generate a synchronization signal block (SSB) associated with an SSB configuration for an operating band having a transmission bandwidth that is narrower than a channel bandwidth; wherein the SSB includes:

a punctured physical broadcast channel (PBCH), and a primary synchronization signal (PSS) and a secondary synchronization signal (SSS) associated with a synchronization raster that is indicated by an absolute radio frequency channel number (ARFCN) value associated with the channel bandwidth and wherein the ARFCN value associated with the SSB corresponds to a global synchronization channel number (GSCN) value that differs from a GSCN value associated with an SSB that includes a non-punctured PBCH; and transmit the SSB associated with the SSB configuration.

* * * * *